US011140347B2

(12) United States Patent
Honda

(10) Patent No.: US 11,140,347 B2
(45) Date of Patent: Oct. 5, 2021

(54) IMAGING ELEMENT, IMAGING ELEMENT CONTROL METHOD, IMAGING APPARATUS, AND ELECTRONIC DEVICE

(71) Applicant: SONY SEMICONDUCTOR SOLUTIONS CORPORATION, Kanagawa (JP)

(72) Inventor: Katsumi Honda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/476,747

(22) PCT Filed: Jan. 5, 2018

(86) PCT No.: PCT/JP2018/000096
§ 371 (c)(1),
(2) Date: Jul. 9, 2019

(87) PCT Pub. No.: WO2018/135319
PCT Pub. Date: Jul. 26, 2018

(65) Prior Publication Data
US 2019/0364235 A1    Nov. 28, 2019

(30) Foreign Application Priority Data

Jan. 19, 2017  (JP) .............................. JP2017-007478

(51) Int. Cl.
*H04N 5/378* (2011.01)
*H04N 5/369* (2011.01)
(Continued)

(52) U.S. Cl.
CPC .............. *H04N 5/378* (2013.01); *H04N 5/379* (2018.08); *H04N 5/3765* (2013.01)

(58) Field of Classification Search
CPC ...... H04N 5/378; H04N 5/379; H04N 5/3765; H04N 5/37455; H04N 5/3742; H04N 5/3745
See application file for complete search history.

(56) References Cited

U.S. PATENT DOCUMENTS 6,525,304 B1    2/2003  Merrill et al.
2013/0256512 A1*  10/2013  Shioya ................... H04N 5/357
                                                          250/208.1
(Continued)

FOREIGN PATENT DOCUMENTS

CN    101171849 A    4/2008
CN    101587680 A    11/2009
(Continued)

OTHER PUBLICATIONS

Extended European Search Report for EP Patent Application No. 18740994.1, dated Oct. 14, 2019, 11 pages.
(Continued)

*Primary Examiner* — Christopher K Peterson
(74) *Attorney, Agent, or Firm* — Chip Law Group

(57) ABSTRACT

This disclosure relates to an imaging element, an imaging element control method, an imaging apparatus, and an electronic device adapted to suppress the drop in yield of the imaging element with an ever-higher density of circuitry. Multiple transfer paths are configured to transfer, bit by bit, a time code of a predetermined number of bits for use in converting into a digital signal a pixel signal reflecting the intensity of light received by a pixel. The transfer paths are provided with a relief transfer path that is switched for use in the case where an error has occurred on the multiple transfer paths. This disclosure may be applied to the imaging element.

13 Claims, 10 Drawing Sheets

(51) Int. Cl.
*H04N 5/376* (2011.01)
*H04N 5/3745* (2011.01)
*H04N 5/374* (2011.01)

(56) References Cited

U.S. PATENT DOCUMENTS

| | | | |
|---|---|---|---|
| 2015/0163423 A1 | 6/2015 | Yin et al. | |
| 2016/0156865 A1* | 6/2016 | Hayashi | H04N 5/3698 348/302 |
| 2017/0272678 A1 | 9/2017 | Sakakibara et al. | |
| 2018/0013412 A1 | 1/2018 | Kikuchi et al. | |
| 2018/0351540 A1 | 12/2018 | Kikuchi et al. | |

FOREIGN PATENT DOCUMENTS

| | | |
|---|---|---|
| CN | 105657297 A | 6/2016 |
| CN | 107409187 A | 11/2017 |
| EP | 3026894 A2 | 6/2016 |
| JP | 2016-058763 A | 4/2016 |
| JP | 2016-058763 A | 4/2017 |
| JP | 6579744 B2 | 9/2019 |
| WO | 02/45404 A2 | 6/2002 |
| WO | 2016/009832 A1 | 1/2016 |
| WO | 2016/136448 A1 | 9/2016 |

OTHER PUBLICATIONS

Hansen, et al., "8-bit 5-MS/s Analog-to-Digital Converter for Pixel-Level Integration", IEEE Transactions on Nuclear Science, vol. 60, Issue 5, Oct. 2013, pp. 3843-3851.

Office Action for CN Patent Application No. 201880006832.0, dated Apr. 28, 2021, 13 pages of English Translation and 06 pages of Office Action.

* cited by examiner

IMAGING ELEMENT, IMAGING ELEMENT CONTROL METHOD, IMAGING APPARATUS, AND ELECTRONIC DEVICE

CROSS REFERENCE TO RELATED APPLICATIONS

This application is a U.S. National Phase of International Patent Application No. PCT/JP2018/000096 filed on Jan. 5, 2018, which claims priority benefit of Japanese Patent Application No. JP 2017-007478 filed in the Japan Patent Office on Jan. 19, 2017. Each of the above-referenced applications is hereby incorporated herein by reference in its entirety.

TECHNICAL FIELD

The present disclosure relates to an imaging element, an imaging element control method, an imaging apparatus, and an electronic device. More particularly, the disclosure relates to an imaging element, an imaging element control method, an imaging apparatus, and an electronic device adapted to boost yield.

BACKGROUND ART

The method of reading a signal from an imaging element may involve, for example, performing AD conversion (Analog-Digital conversion) in a limited area such as inside a pixel. For such a case, an integration type (slope type) AD conversion method that configures a comparator and a downstream digital circuit has been proposed as a method for providing high area efficiency.

A circuit configuration in which a slope signal is input multiple times to the comparator, with the downstream digital circuit used as a DRAM (Dynamic Random Access Memory), is well known as an exemplary technique for implementing the AD conversion in the limited area using the integration type AD conversion method.

In the case of 8-bit AD conversion, for example, the same slope signal is input to the comparator repeatedly 8 times. The operation of storing a 0 or 1 code at the time of inversion of the comparator output into the DRAM circuit is repeated 8 times. Upon completion of the comparison over the entire area, the content of the DRAM circuit is read out.

However, a configuration where the AD converter is arranged independently for each pixel is subject to constraints on the area for accommodating circuitry. This configuration contrasts from the one in which the AD converter is configured for each column of pixels as in a parallel column arrangement with a relatively high degree of area freedom. It is thus difficult to manufacture the AD converters that fully meet desired requirements.

For example, the speed of determination at the time of comparison could be lowered. As another example, attempts to improve performance could lead to large power consumption.

Given the situation, techniques have been proposed for suppressing such a delay in the speed of determination and an increase in power consumption (see PTL 1).

CITATION LIST

Patent Literature

[PTL 1]
WO 2016/136448

SUMMARY

Technical Problem

Configuring a system with the proposed circuit arrangements, however, may entail a growing number of pixels leading to an abrupt increase in circuit layout density. This in turn can raise the probability of occurrences of circuit failures resulting in a defective code, for example.

In the case of a solid-state imaging apparatus and of an occurrence of failure of pixel data, the occurrence of failure, even a single-bit failure, renders the chip functionally unusable. This leads to a deteriorating yield. It is thus necessary to lower the probability of occurrences of failures.

The present disclosure has been devised in view of the above circumstances. Particularly, the disclosure is aimed at configuring relief circuits beforehand and, upon detection of a failure, relieving the failed circuit using a relief circuit so as to suppress the occurrences of failures and boost yield.

Solution to Problem

According to one aspect of the present disclosure, there is provided an imaging element including: a plurality of transfer paths configured to transfer, bit by bit, a time code of a predetermined number of bits for use in converting into a digital signal a pixel signal reflecting intensity of light received by a pixel; a relief transfer path configured the same as the transfer paths; a determination section configured to determine whether there is an error on any of the transfer paths; and a switching section configured to switch some of the plurality of transfer paths and a plurality of the relief transfer paths for use as the transfer paths for transferring the time code of the predetermined number of bits on a basis of a result of the determination made by the determination section.

The determination section can determine whether there is an error on any of the transfer paths by comparing an expected value of a result of transferring predetermined data via the transfer paths with the result of having transferred the predetermined data via the transfer paths.

Each of the plurality of transfer paths can include a storage section configured to store the time code correspondingly bit by bit.

At a time of transfer via the transfer paths, the predetermined data can be written to the storage section corresponding to each of the transfer paths at the same time as being transferred, the determination section determining whether there is an error on any of the transfer paths by comparing the expected value with the result of having transferred the predetermined data via the transfer paths.

With the expected value set to a predetermined value, the determination section can determine whether there is an error on each of the transfer paths by comparing the expected value with a result of transferring the predetermined data set to "1" and with a result of transferring the predetermined data set to "0" independently of each other.

On a basis of a result of the determination, the switching section can switch the transfer paths excluding the transfer path determined to be erroneous and the relief transfer path, for use as the transfer paths for transferring the time code of the predetermined number of bits.

On the basis of the result of the determination, the switching section can isolate the bit transfer path determined to be erroneous, and switch the plurality of transfer paths of the bits lower than the bit determined to be erroneous and the relief transfer paths for use in transferring the time code of the bits lower than the erroneous bits.

At the time of transfer via the transfer paths, the predetermined data can be written to the storage sections corresponding to the transfer paths before being read out and transferred, the determination section determining whether there is an error in any of the storage sections corresponding to the transfer paths by comparing the expected value with the result of writing the predetermined data to the storage sections via the transfer paths before having the predetermined data read out and transferred.

With the expected value set to a predetermined value, the determination section can determine whether there is an error in each of the storage sections corresponding to the transfer paths by comparing the expected value with a result of transferring the predetermined data set to "1" and a result of transferring the predetermined data set to "0" independently of each other.

The relief transfer path can further include a relief storage section configured to store, bit by bit, the time code to be transferred. On a basis of a result of the determination, the switching section can switch the storage sections corresponding to the plurality of transfer paths excluding the storage section determined to be erroneous and the corresponding transfer path and the relief storage section corresponding to the relief transfer path, for use as the storage sections corresponding to the transfer paths used for transferring, writing, and reading out the time code of the predetermined number of bits.

The determination section can determine whether there is an error on any of the transfer paths by comparing the expected value with the result of transferring the predetermined data via the transfer paths, before determining whether there is an error in any of the storage sections corresponding to the transfer paths by comparing the expected value with the result of writing the predetermined data to the storage sections before having the predetermined data read out and transferred. On a basis of a result of the determination, the switching section can switch the storage sections corresponding to the plurality of transfer paths excluding the transfer path determined to be erroneous and the corresponding storage section, and the relief storage section corresponding to the relief transfer path, for use as the storage sections corresponding to the transfer paths used either for transferring and writing the time code of the predetermined number of bits or for transferring, writing, and reading out the time code of the predetermined number of bits.

According to another aspect of the present disclosure, there is provided a control method for use with an imaging element including a plurality of transfer paths configured to transfer, bit by bit, a time code of a predetermined number of bits for use in converting into a digital signal a pixel signal reflecting intensity of light received by a pixel; and a relief transfer path configured the same as the transfer paths, the control method including: determining whether there is an error on any of the transfer paths; and switching some of the plurality of transfer paths and a plurality of the relief transfer paths for use as the transfer paths for transferring the time code of the predetermined number of bits on a basis of a result of the determination.

According a further aspect of the present disclosure, there is provided an imaging apparatus including: a plurality of transfer paths configured to transfer, bit by bit, a time code of a predetermined number of bits for use in converting into a digital signal a pixel signal reflecting intensity of light received by a pixel; a relief transfer path configured the same as the transfer paths; a determination section configured to determine whether there is an error on any of the transfer paths; and a switching section configured to switch some of the plurality of transfer paths and a plurality of the relief transfer paths for use as the transfer paths for transferring the time code of the predetermined number of bits on a basis of a result of the determination made by the determination section.

According to a still further aspect of the present disclosure, there is provided an electronic device including: a plurality of transfer paths configured to transfer, bit by bit, a time code of a predetermined number of bits for use in converting into a digital signal a pixel signal reflecting intensity of light received by a pixel; a relief transfer path configured the same as the transfer paths; a determination section configured to determine whether there is an error on any of the transfer paths; and a switching section configured to switch some of the plurality of transfer paths and a plurality of the relief transfer paths for use as the transfer paths for transferring the time code of the predetermined number of bits on a basis of a result of the determination made by the determination section.

Thus according to some aspects of the present disclosure, a plurality of transfer paths is configured to transfer, bit by bit, a time code of a predetermined number of bits for use in converting into a digital signal a pixel signal reflecting the intensity of light received by a pixel. A relief transfer path is configured the same as the transfer paths. A determination section is configured to determine whether there is an error on any of the transfer paths. A switching section is configured to switch some of the transfer paths and the relief transfer paths for use as the transfer paths for transferring the time code of the predetermined number of bits on the basis of the result of the determination made by the determination section.

Advantageous Effects of Invention

Thus according to one aspect of the present disclosure, it is possible to suppress the occurrences of failures and boost yield.

DESCRIPTION OF EMBODIMENT

Figure 1:
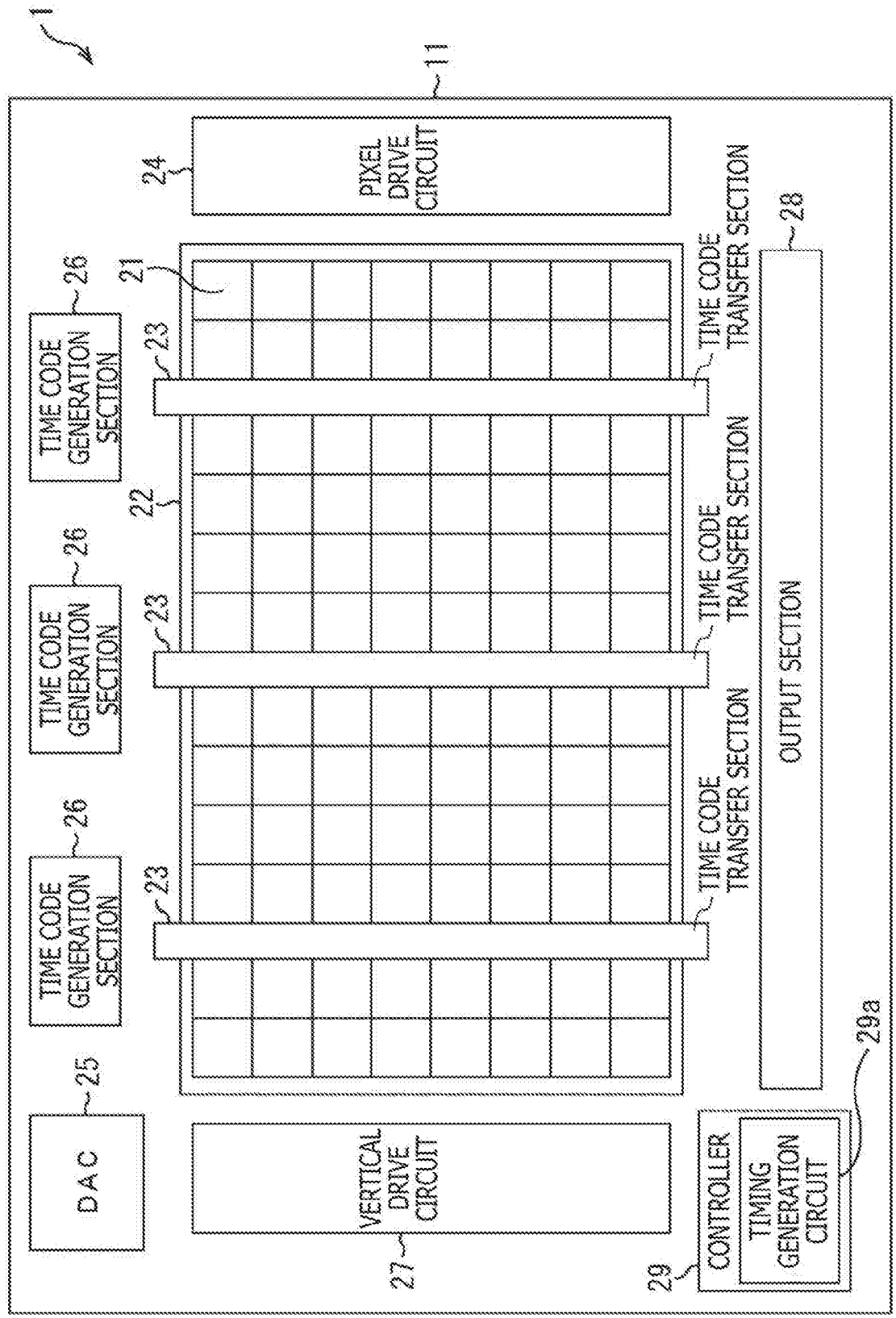
FIG. 1 is a schematic diagram depicting a schematic configuration of a solid-state imaging apparatus according to the present disclosure.

Furthermore, a preferred embodiment of the present disclosure is described below in detail with reference to the accompanying drawings. Note that, throughout this description and the accompanying drawings, the components having substantially the same function will be designated by the same reference signs and their descriptions will be omitted where redundant.

The description will be given under the following headings:

1. Schematic exemplary configuration of the solid-state imaging apparatus
2. Detailed exemplary configuration of the pixel
3. Multiple-substrate configuration 1
4. Multiple-substrate configuration 2
5. Detailed configuration for controlling the time code transfer section
6. Detailed exemplary configuration of the data line selection circuit
7. Exemplary configuration of the time code transfer section
8. Exemplary configuration of the determination circuit and the ERR information storage latch
9. Failure detection and relief process
10. Examples of application to electronic devices
11. Usage examples of the solid-state imaging apparatus <1. Schematic Exemplary Configuration of the Solid-State Imaging Apparatus>

FIG. 1 depicts a schematic configuration of a solid-state imaging apparatus according to the present disclosure.

A solid-state imaging apparatus 1 in FIG. 1 has a pixel array section 22 with pixels 21 arrayed two-dimensionally therein on a semiconductor substrate 11 that uses, for example, silicon (Si) as the semiconductor. The pixel array section 22 includes a time code transfer section 23 that transfers a time code generated by a time code generation section 26 to each pixel 21. In addition, formed around the pixel array section 22 on the semiconductor substrate 11 are a pixel drive circuit 24, a DAC (Digital Analog Converter) 25, a time code generation section 26, a vertical drive circuit 27, an output section 28, and a controller 29.

Each of the pixels 21 arrayed two-dimensionally includes a pixel circuit 41 and an ADC 42, as will be discussed later with reference to FIG. 2. The pixel 21 generates a charge signal reflecting the intensity of light received by a light receiving element (e.g., photodiode) in the pixel. The pixel 21 converts the generated charge signal to a digital pixel signal SIG and outputs the digital pixel signal SIG.

The pixel drive circuit 24 drives the pixel circuit 41 (FIG. 2) in the pixel 21. The DAC 25 generates a reference signal (reference voltage signal) REF that is a slope signal of which the level (voltage) decreases monotonously over time. The DAC 25 supplies the generated reference signal REF to each pixel 21. The time code generation section 26 generates a time code for use by each pixel 21 in converting an analog pixel signal SIG to the digital signal (AD conversion), and supplies the generated time code to the corresponding time code transfer section 23. Multiple time code generation sections 26 are provided for the pixel array section 22. Inside the pixel array section 22, there are as many time code transfer sections 23 as the number of time code generation sections 26 provided. In other words, the time code generation sections 26 correspond on a one-to-one basis to the time code transfer sections 23 to which the time code generated by the time code generation sections 26 is transferred.

The vertical drive circuit 27 performs control to let the digital pixel signal SIG generated in each of the pixels 21 be output in a predetermined sequence to the output section 28 in accordance with a timing signal supplied from a timing generation circuit 29a. The digital pixel signal SIG output from the pixel 21 is output by the output section 28 to outside of the solid-state imaging apparatus 1. The output section 28 performs, as needed, predetermined digital signal processing such as black level correction for correcting the black level and CDS (Correlated Double Sampling), before outputting what is thus processed to the outside.

The controller 29 includes the timing generation circuit 29a configured, for example, with a timing generator for generating various timing signals. The controller 29 supplies the diverse timing signals thus generated to the pixel drive circuit 24, DAC 25, and vertical drive circuit 27, among others. Also, the controller 29 controls the operation of repeater circuits 101 (FIG. 5) that control driving of the time code transfer sections 23.

The solid-state imaging apparatus 1 is configured as described above. Note that, whereas FIG. 1 indicates as if all circuits constituting the solid-state imaging apparatus 1 are formed on a single semiconductor substrate 11, in fact the component circuits of the solid-state imaging apparatus 1 are arranged on multiple semiconductor substrates 11, as will be discussed later with reference to FIGS. 3 and 4.

<2. Detailed Exemplary Configuration of the Pixel>

Figure 2:
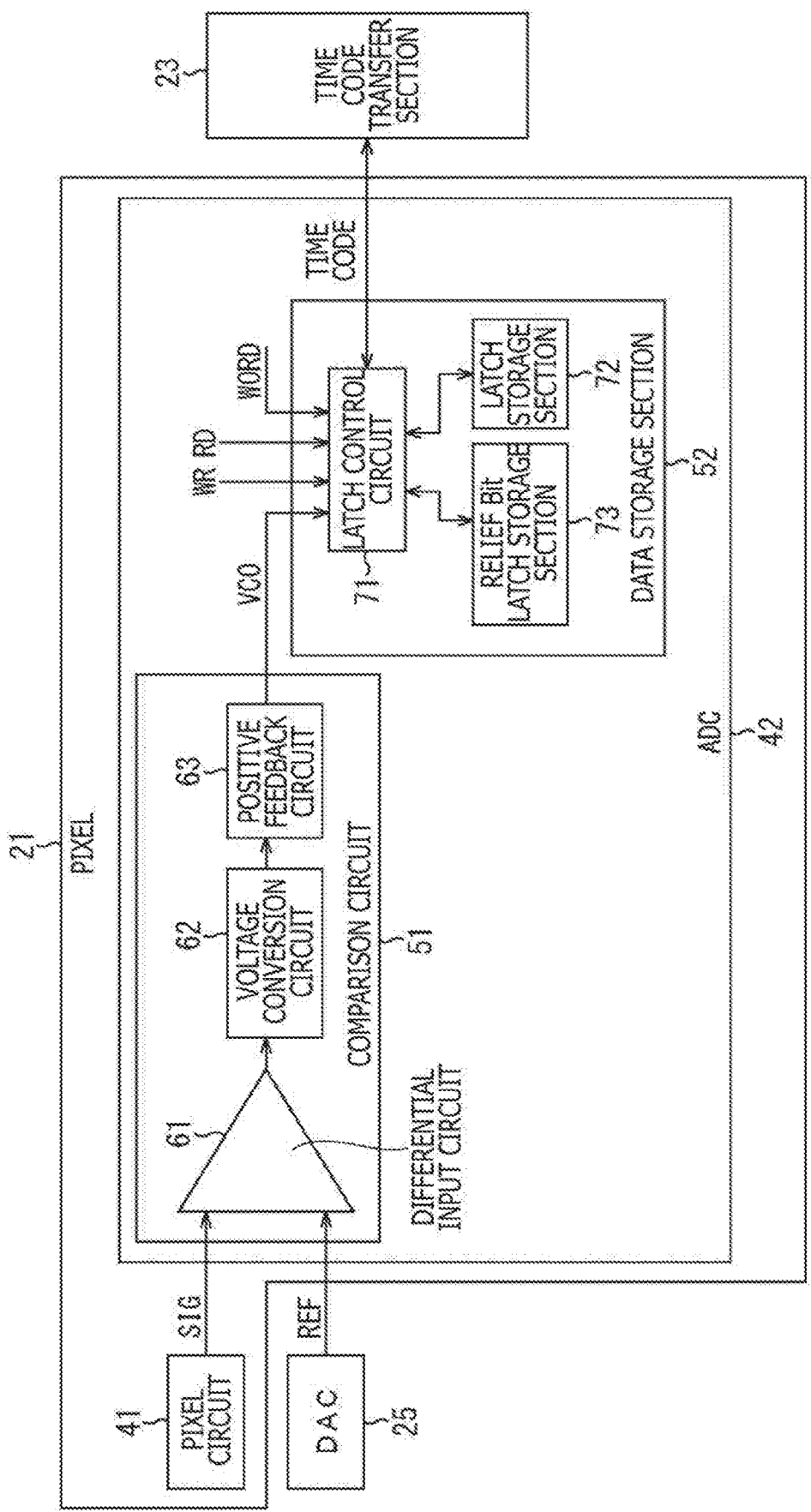
FIG. 2 is a block diagram depicting a detailed configuration of a pixel.

FIG. 2 is a block diagram depicting a detailed configuration of the pixel 21.

The pixel 21 includes the pixel circuit 41 and the ADC (Analog Digital Converter) 42.

The pixel circuit 41 outputs to the ADC 42 a charge signal reflecting the intensity of received light as an analog pixel signal SIG. The ADC 42 converts the analog pixel signal SIG supplied from the pixel circuit 41 into a digital signal.

The ADC 42 includes a comparison circuit 51 and a data storage section 52.

The comparison circuit 51 compares the reference signal REF supplied from the DAC 25 with the pixel signal SIG, and outputs an output signal VCO as a comparison result signal representing the result of the comparison. When the reference signal REF becomes equal to the pixel signal SIG (in voltage), the comparison circuit 51 inverts the output signal VCO.

The comparison circuit 51 includes a differential input circuit 61, a voltage conversion circuit 62, and a positive feedback circuit (PFB: Positive Feedback) 63.

Besides receiving input of the output signal VCO from the comparison circuit 51, the data storage section 52 is supplied with a WR signal indicating a pixel signal write operation and a RD signal indicating a pixel signal read operation from the vertical drive circuit 27, as well as with a WORD signal from the vertical drive circuit 27 for controlling the readout timing of the pixel 21 during the pixel signal read operation. The data storage section 52 is also supplied with a time code generated by the time code generation section 26 and transferred via the time code transfer section 23.

The data storage section 52 includes a latch control circuit 71 that controls time code read and write operations based on the WR signal and on the RD signal, a latch storage section 72 that stores the time code, and a relief Bit latch storage section 73 aimed at relieving an error that may occur in the latch storage section 72.

During the time code write operation, the latch control circuit 71 causes the latch storage section 72 to store the time code that is supplied from the time code transfer section 23 and updated per unit time as long as a Hi (High) output signal VCO is being input from the comparison circuit 51. When the reference signal REF becomes equal to the pixel signal SIG (in voltage) and the output signal VCO from the comparison circuit 51 is inverted to Lo (Low), the latch control circuit 71 stops writing (updating) the supplied time code and causes the latch storage section 72 to hold the time code most recently stored therein. The time code stored in the latch storage section 72 represents the time at which the reference signal REF became equal to the pixel signal SIG. The pixel signal SIG gives data indicative of the reference voltage at that time, i.e., the signal represents digitized light intensity.

After a sweep of the reference signal REF, with the time code stored into the latch storage section 72 of every pixel 21 in the pixel array section 22, the write operations on the pixels 21 are switched to read operations.

During the time code read operation, the latch control circuit 71 outputs the time code (digital pixel signal SIG) stored in the latch storage section 72 to the time code transfer section 23 when it is time to read the own pixel 21 based on the WORD signal for readout timing control. The time code transfer section 23 transfers the supplied time code successively in the column direction (in the vertical direction) to the output section 28.

The relief Bit latch storage section 73 is a latch storage section that relieves the latch of a bit on which an error may occur in the latch storage section 72 for bit-by-bit storage. Thus the relief Bit latch storage section 73 is configured the same as the latch storage section 72 bit for bit.

The time code transfer section 23 is provided with a transfer path for each of the bits constituting the time code. The latch storage section 72 is also configured with a latch for every bit. Furthermore, the transfer paths of the bits constituting the time code transfer section 23 are paired respectively with the latches of the bits constituting the latch storage section 72. In the case where at least one of the bit-by-bit transfer paths or one of the latches develop an error, i.e., in the event of an occurrence of failure, the failed latch and transfer path are replaced with a bit-by-bit latch in the relief Bit latch storage section 73 and with the corresponding transfer path of the time code transfer section 23 (time code transfer one-bit row 142 for relief Bit use in FIG. 5).

The relief Bit latch storage section 73 and the time code transfer one-bit row 142 for relief Bit use are provided for at least one bit.

<3. Multiple-Substrate Configuration 1>

The solid-state imaging apparatus 1 has its circuits formed separately on multiple semiconductor substrates 11. For example, the solid-state imaging apparatus 1 may be configured as depicted in FIG. 3.

Figure 3:
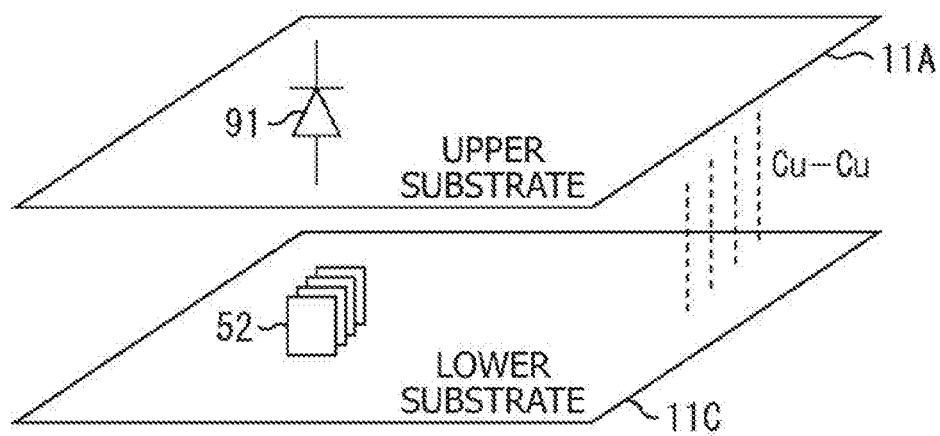
FIG. 3 is a conceptual diagram of a solid-state imaging apparatus configured with two semiconductor substrates stacked one on top of the other.

FIG. 3 is a conceptual diagram of the solid-state imaging apparatus 1 configured with two semiconductor substrates 11, i.e., an upper substrate 11A and a lower substrate 11C stacked one on top of the other.

On the upper substrate 11A, at least the pixel circuits 41 each including a photodiode 91 are formed. On the lower substrate 11C, at least the data storage sections 52 for storing the time code and the time code transfer sections 23 are formed. The upper substrate 11A and the lower substrate 11C are bonded together by metal bonding such as by Cu—Cu bonding.

<4. Multiple-Substrate Configuration 2>

Whereas FIG. 3 indicates the example of the solid-state imaging apparatus 1 configured with two semiconductor substrates 11, the solid-state imaging apparatus 1 may be configured alternatively with three semiconductor substrates 11.

Figure 4:
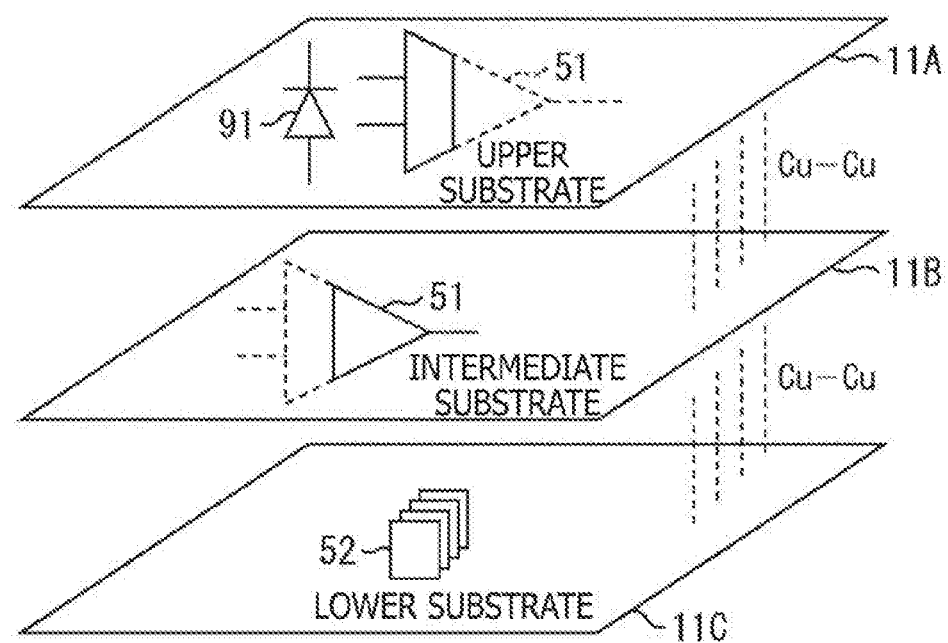
FIG. 4 is a conceptual diagram of a solid-state imaging apparatus configured with three semiconductor substrates stacked one on top of the other.

FIG. 4 is a conceptual diagram of the solid-state imaging apparatus 1 configured with three semiconductor substrates, i.e., an upper substrate 11A, an intermediate substrate 11B, and a lower substrate 11C stacked one on top of the other.

On the upper substrate 11A, the pixel circuits 41 each including the photodiode 91 and at least part of the comparison circuits 51 are formed. On the lower substrate 11C, at least the data storage sections 52 for storing the time code and the time code transfer sections 23 are formed. On the intermediate substrate 11B, the remaining comparison circuits 51 not disposed on the upper substrate 11A are formed. The upper substrate 11A and the intermediate substrate 11B as well as the intermediate substrate 11B and the lower substrate 11C are bonded together by metal bonding such as by Cu—Cu bonding.

<5. Detailed Configuration for Controlling the Time Code Transfer Section>

Figure 5:
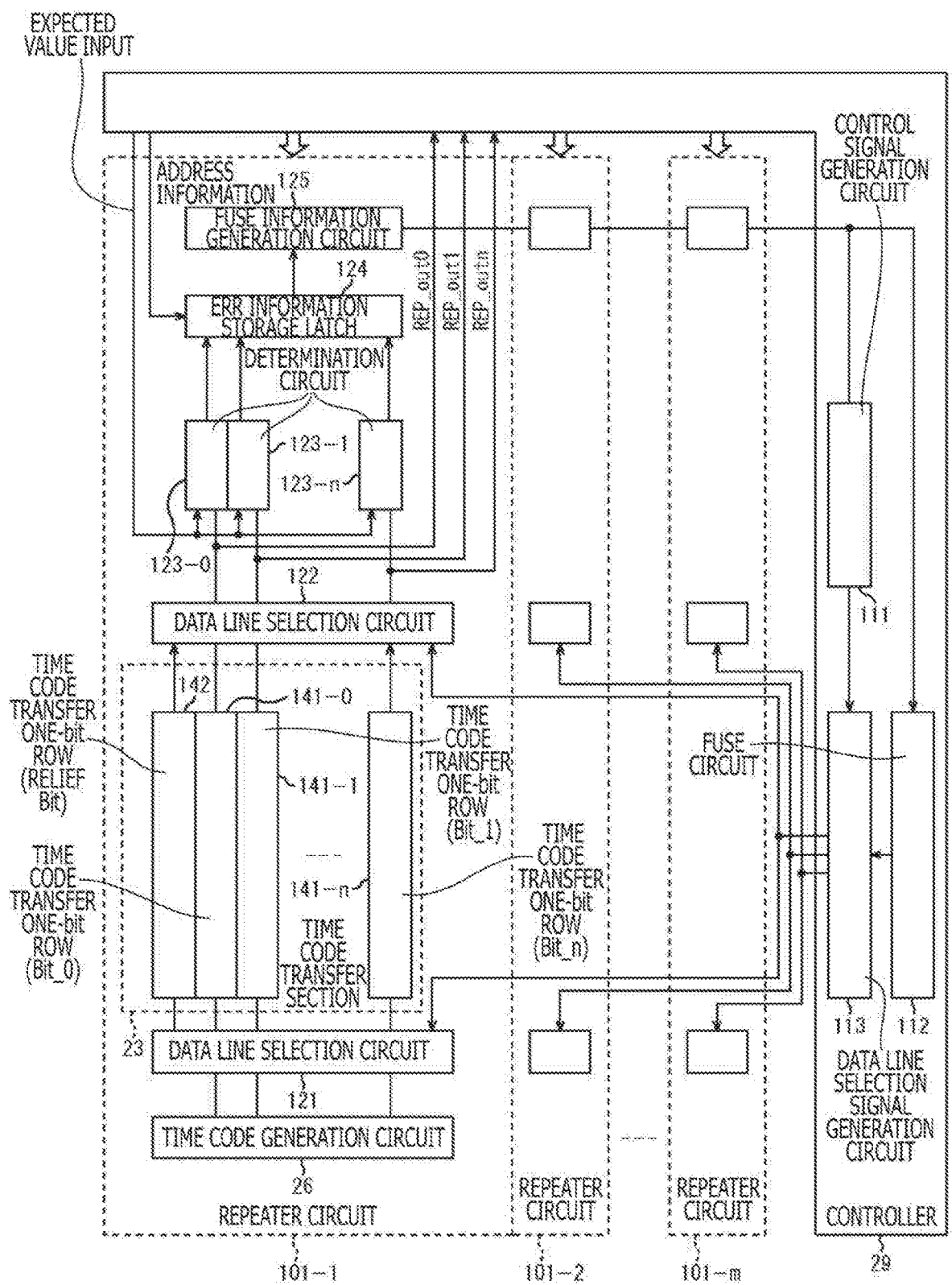
FIG. 5 is an explanatory diagram explaining a detailed configuration for controlling a time code transfer section of the present disclosure.

Next, a detailed configuration for controlling the time code transfer section 23 is explained below with reference to FIG. 5.

A configuration for controlling the time code transfer section 23 includes circuits called repeater circuits 101-1 through 101-n. There are as many repeater circuits 101-1 through 101-n as the number of the time code transfer sections 23 disposed. In FIG. 5, as many as n repeater circuits 101-1 through 101-n are provided. In the ensuing description, where there is no specific need to distinguish the repeater circuits 101-1 through 101-n individually, they will be generically referred to as the repeater circuit 101. The other configurations hereunder will also be referred to in this manner.

The repeater circuit 101 includes the time code generation section 26, the time code transfer section 23, data line selection circuits 121 and 122, determination circuits 123-0 through 123-n, an ERR information storage latch 124, and a FUSE information generation circuit 125.

The time code transfer section 23 includes as many bit-by-bit transfer paths as the number of the bits (n+1) involved. Indicated in FIG. 5 as the transfer paths are a time code transfer one-bit row 141-0 (Bit_0) as the transfer path for bit-0 data of the time code through a time code transfer one-bit row (Bit_n) 141-n as the transfer path for bit-n data of the time code. In other words, the time code transfer one-bit row (Bit_n) 141-n is indicated to be the transfer path for transferring bit-n (Bit_n) data of the time code. Whereas FIG. 5 depicts the example in which the time code is constituted by (n+1) bits, the time code may be formed alternatively by a different number of bits.

Furthermore, apart from the time code transfer one-bit row (Bit_0) 141-0 through the time code transfer one-bit row (Bit_n) 141-n, the time code transfer section 23 includes a time code transfer one-bit row (relief Bit) 142 as a relief transfer path for relieving any one of the transfer paths on which an error may occur, the time code transfer one-bit row 142 being configured the same as the time code transfer one-bit row (Bit_n) 141-n. Whereas FIG. 5 depicts the example in which the time code transfer one-bit row (relief Bit) 142 is provided for one bit only, there may be provided alternatively the time code transfer one-bit rows 142 for multiple bits. In the ensuing description, however, the time code transfer one-bit row (relief Bit) 142 is assumed to be provided for one bit only. The description that follows will be based on that assumption of the example in FIG. 5.

In accordance with a selection signal from a data line selection signal generation circuit 113 in the controller 29, the data line selection circuits 121 and 122 switch the time code transfer one-bit row (Bit_0) 141-0 through the time code transfer one-bit row (Bit_n) 141-n and the time code transfer one-bit row (relief Bit) 142 so as to transfer the data of each bit of the time code generated by the time code generation section 26. The data line selection circuit 122 outputs respective transfer results REP_out0 through REP_outn of the bits to the determination circuits 123-0 through 123-n, and the controller 29.

In the case where no error has occurred on any of the transfer paths of the time code transfer one-bit row (Bit_0) 141-0 through the time code transfer one-bit row (Bit_n) 141-n, the data line selection circuits 121 and 122 transfer the data of the bits in the time code using the time code transfer one-bit row (Bit_0) 141-0 through the time code transfer one-bit row (Bit_n) 141-n in accordance with the signal from the data line selection signal generation circuit 113. However, in the case where execution of a failure detection and relief process, to be discussed later, detects the occurrence of an error on any one of the bit transfer paths of the time code transfer one-bit row (Bit_0) 141-0 through the time code transfer one-bit row (Bit_n) 141-n, the bit transfer path on which the error has occurred is isolated. Then the time code transfer one-bit row (relief Bit) 142 is used to transfer the data of the bits of the time code.

The determination circuits 123-0 through 123-n compare the transfer results of the time code transfer one-bit row (Bit_0) 141-0 through the time code transfer one-bit row (Bit_n) 141-n individually with an expected value. In so doing, the determination circuits 123-0 through 123-n determine whether an error has occurred on each of the transfer paths, and store the result of the determination into the FRR information storage latch 124.

The ERR information storage latch 124 latches the presence or absence of an error on each of the bits of the time code transfer one-bit row (Bit_0) 141-0 through the time code transfer one-bit row (Bit_n) 141-n, i.e., on each of the transfer paths. At the same time, the ERR information storage latch 124 supplies the result of the determination to the FUSE information generation circuit 125 in accordance with address information from the controller 29.

On the basis of the determination result from the ERR information storage latch 124, the FUSE information generation circuit 125 generates FUSE information that includes information regarding the determination result indicative of the presence or absence of an error on each of the transfer paths. The FUSE information generation circuit 125 stores the generated FUSE information into a FUSE circuit 112 while outputting the FUSE information to a control signal generation circuit 111 at the same time.

In the case where the FUSE information includes a transfer path on which an error has occurred, the control signal generation circuit 111 supplies the data line selection signal generation circuit 113 with a control signal acting as a relief measure that gives instructions to isolate the erroneous transfer path from among the time code transfer one-bit row (Bit_0) 141-0 through the time code transfer one-bit row (Bit_n) 141-n and to use instead the time code transfer one-bit row (relief Bit) 142 for relief purposes so as to reconfigure the transfer paths.

The data line selection signal generation circuit 113 supplies the data line selection circuits 121 and 122 with a selection signal to switch some of the time code transfer one-bit row (Bit_0) 141-0 through the time code transfer one-bit row (Bit_n) 141-n and of the time code transfer one-bit row (relief Bit) 142 for use as the transfer paths for (n+1) bits, the data line selection signal generation circuit 113 further performing control to transfer the time code via the transfer paths for (n+1) bits.

More specifically, by default, the data line selection signal generation circuit 113 controls the data line selection circuits 121 and 122 to transfer the time code for (n+1) bits using the transfer paths ranging from the time code transfer one-bit row (Bit_0) 141-0 to the time code transfer one-bit row 141-n (Bit_n).

Furthermore, upon receipt of a control signal including a selection signal designating execution of the relief measure from the control signal generation circuit 111, the data line selection signal generation circuit 113 reads the FUSE information from the FUSE circuit 112 and thereby controls the data line selection circuits 121 and 122 so as to isolate the erroneous transfer path from among the transfer paths ranging from the time code transfer one-bit row (Bit_0) 141-0 to the time code transfer one-bit row (Bit_n) 141-n and to transfer the time code for (n+1) bits using the time code transfer one-bit row (relief Bit) 142.

<6. Detailed Exemplary Configuration of the Data Line Selection Circuit>

A detailed exemplary configuration of the data line selection circuits 121 and 122 is explained below with reference to FIG. 6.

The data line selection circuits 121 and 122 each include switches SW0 through SWn for (n+1) bits. The switches SW0 through SWn are each arranged for each transfer path, i.e., arranged to interpose between adjacent two of terminals 142a and 141a-0 through 141a-n that are connected, respectively, with the time code transfer one-bit row (relief Bit) 142 and with the time code transfer one bit row (Bit_0) 141-0 through the time code transfer one-bit row (Bit_n) 141-n, each of the switches being configured to switch between two adjacent terminals.

Figure 6:
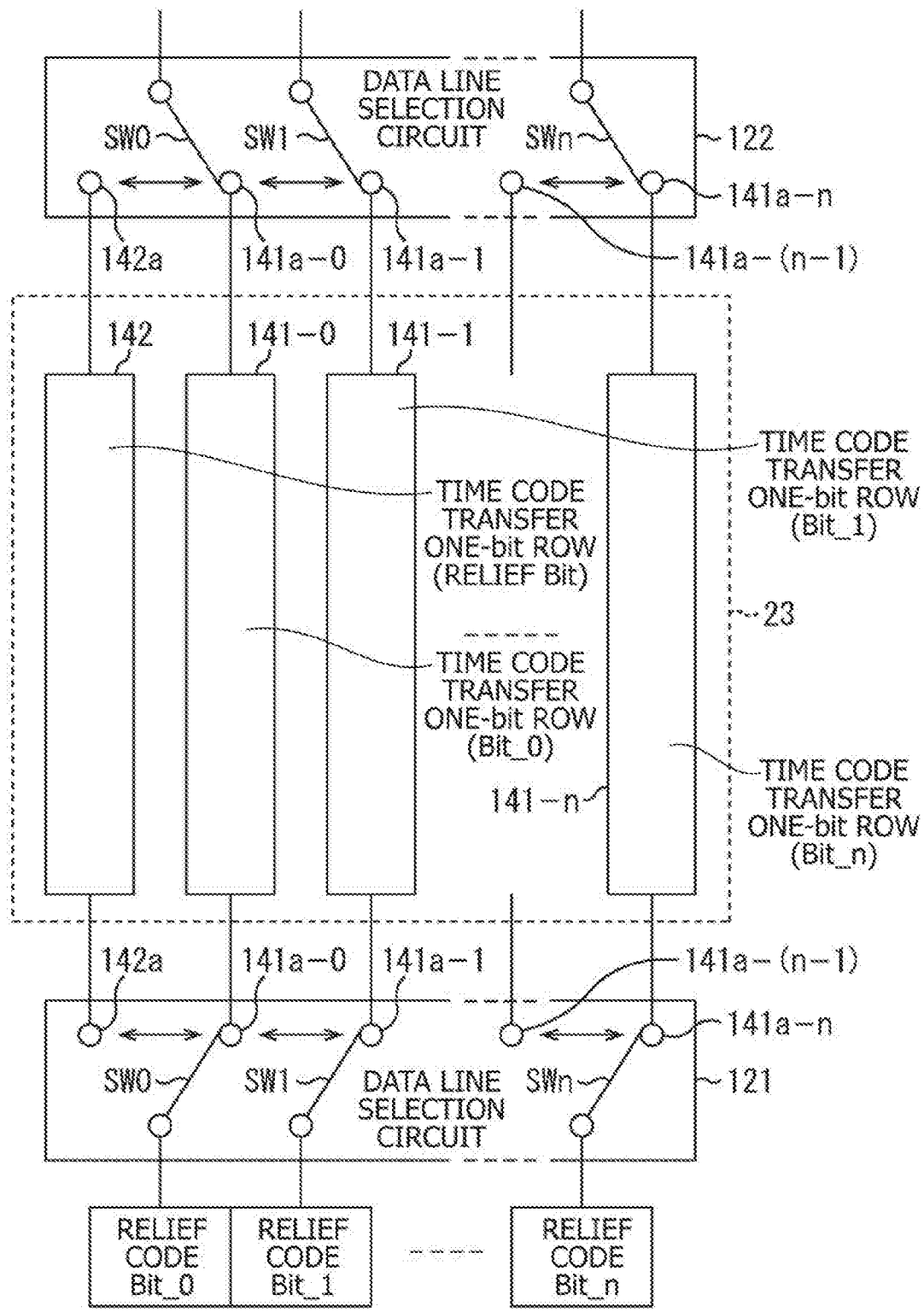
FIG. 6 is an explanatory diagram explaining an exemplary configuration of a data line selection circuit in FIG. 5.

As a result, by default, the data line selection circuits 121 and 122 connect the switches SW0 through SWn with the terminals 141a-0 through 141a-n of the time code transfer one-bit row (Bit_0) 141-0 through the time code transfer one-bit row (Bit_n) 141-n as the transfer paths corresponding to the switches, as depicted in FIG. 6. When the switches SW0 through SWn are connected in this manner, the switch SW0 is not connected with the terminal 142a of the time code transfer one-bit row (relief Bit) 142 illustrated in the left part of FIG. 6. It is thus indicated that the time code transfer one-bit row (relief Bit) 142 as the transfer path for relief use is not in use.

For example, in the case where an error has occurred on the time code transfer one-bit row (Bit_0) 141-0 as the transfer path for bit-0 data of the time code, the data line selection circuits 121 an 123 control the switch SW0 to connect with the terminal 142a of the time code transfer one-bit row (relief Bit) 142 as the transfer path for relief use in the left part of FIG. 6, in accordance with the selection signal from the data line selection signal generation circuit 113.

As a result, the time code transfer one-bit row (Bit_0) 141-0 on which the error has occurred is replaced with the time code transfer one-bit row (relief Bit) 142 as the relief-use transfer path that is used to transfer the bit-0 data of the time code.

As another example, in the case where an error has occurred on the time code transfer one-bit row (Bit_1) 141-1 as the transfer path for bit-1 data of the time code, the data line selection circuits 121 and 122 control the switches SW0 and SW1 to connect, respectively, with the terminal 142 of the time code transfer one-bit row (relief Bit) 142 as the transfer path for relief use and with the terminal 141*a*-1 of the time code transfer one-bit row (Bit_0) 141-0 in the left part of FIG. 6, in accordance with the selection signal from the data line selection signal generation circuit 113.

As a result, the bit-1 data of the time code is transferred via the time code transfer one-bit row (Bit_0) 141-0 replacing the time code transfer one-bit row (Bit_1) 141-1 on which the error has occurred. The bit-0 data of the time code that has been transferred via the transfer path of the time code transfer one-bit row (Bit_0) 141-0 is transferred using the time code transfer one-bit row (relief Bit) 142 as the transfer path for relief use.

In other words, upon occurrence of an error, the transfer path for the erroneous bit is isolated, and the time code transfer one-bit row (relief Bit) 142 as the transfer path for relief use is used instead. The transfer paths for the bits lower than the erroneous bit (in the left part of FIG. 6) are each shifted one bit in the lower-order direction (in the left part of FIG. 6) through control of the switches SW0 through SW*n*. The transfer paths of the time data for (n+1) bits are thus reconfigured.

<7. Exemplary Configuration of the Time Code Transfer Section>

A specific exemplary configuration of the time code transfer section 23 is explained below.

The time code transfer section 23 includes DFF groups 151-1 through 151-*n*, a DFF (D-type flip-flop circuit) 152, Latches 52R-1 through 52R-n, Latches 52L-1 through 52L-n, and a clock signal transfer path 153.

The clock signal transfer path 153 is configured with multiple inverter groups each including two inverters. The clock signal transfer path 153 transfers a clock signal MCLK sequentially to the time code generation sections 26.

In synchronism with the clock signal from the clock signal transfer path 153, the DFF (D-type flip-flop circuit) groups 151-1 through 151-*n* transfer the bits of the time code generated by the time code generation section 26 and write the data to the Latches 52R-1 through 52R-n and to the Latches 52L-1 through 52L-n. In another operation, the DFF groups 151-1 through 151-*n* read the data written in the Latches 52R-1 through 52R-n and in the Latches 52L-1 through 52L-n and transfer the read data to the controller 29 via the DFF 152.

Given the time data transferred from the DFF groups 151-1 through 151-*n*, the Latches 52R-1 through 52R-n and the Latches 52L-1 through 52L-n latch the time code corresponding to the pixel signal of each pixel. Also, the Latches 52R-1 through 52R-n and the Latches 52L-1 through 52L-n output each bit of the time code corresponding to the latched pixel signals to the controller 29 via the transfer paths covered by the DFF groups 151-1 through 151-*n* and by the DFF 152.

More specifically, the individual DFFs in the DFF groups 151 constituting the DFF groups 151-1 through 151-*n* forming the bit-by-bit transfer paths configure the transfer paths for the time code transfer one-bit row (Bit_0) 141-0 through the time code transfer one bit row (Bit_n) 141-*n* and for the time code transfer one-bit row (relief Bit) 142.

Figure 7:
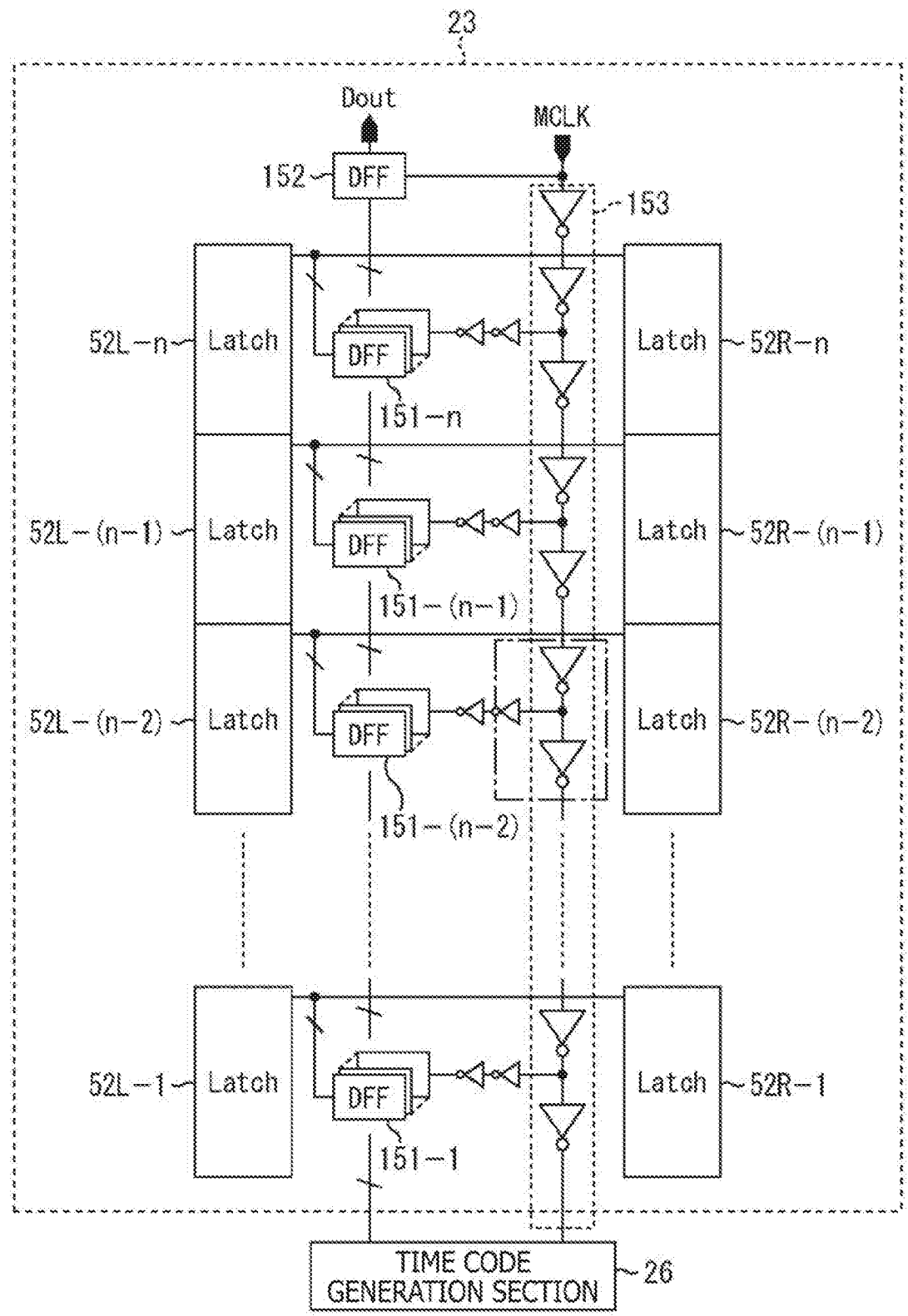
FIG. 7 is an explanatory diagram explaining a detailed exemplary configuration of the time code transfer section in FIG. 5.

Thus in FIG. 7, the data of each bit in the time code generated by the time code generation section 26 is output to each of the DFFs constituting the DFF group 151-*n*. In accordance with the clock signal from the clock signal transfer path 153, the data is then transferred via the DFF group 151-1, DFF group 151-2, . . . DFF group 151-*n*, in that order, before being output to the controller 29 from the DFF 152.

The bit-by-bit transfer paths constituted by the individual DFFs constituting the DFF groups 151-1 through 151-*n* are connected with the Latches 52R-1 through 52R-n and with the Latches 52L-1 through 52L-n in FIG. 7, the latches corresponding to the data storage section 52 of the pixel 21 depicted in FIG. 2. FIG. 7 depicts the configuration example in which the Latches 52L and 52R are provided so as to transfer the time code corresponding to the pixel signals of two pixels via one transfer path. Note that, the description that follows will be based on that configuration example in which each transfer path is connected with the data storage section 52 of one pixel, i.e., connected with either a latch L or a latch R alone.

In other words, as illustrated in FIG. 2, the data storage section 52 includes the latch storage section 72 and the relief Bit latch storage section 73. The latch storage section 72 includes the bit-by-bit latches for the bits of the time data. Similarly, the relief Bit latch storage section 73 includes as many latches as the number of relief Bits. It is assumed, however, that there is only one relief Bit for this example.

The latches for the bits in the latch storage section 72 and the latches for the bits in the relief Bit latch storage section 73 correspond to the time code transfer one-bit row (Bit_0) 141-0 through the time code transfer one-bit row (Bit_n) 141-*n* and to the time code transfer one-bit row (relief Bit) 142.

Thus as explained above with reference to FIG. 6, when the time code transfer one-bit row (Bit_0) 141-0 through the time code transfer one-bit row (Bit_n) 141-*n* and the time code transfer one-bit row (relief Bit) 142 as the transfer paths are switched, the latches for the bits used in the latch storage section 72 and in the relief Bit latch storage section 73 in the corresponding data storage section 52 are also switched.

<8. Exemplary Configuration of the Determination Circuit and the ERR Information Storage Latch>

An exemplary configuration of the determination circuit 123 and the ERR information storage latch 124 is explained below with reference to FIG. 8.

The determination circuit 123 includes a switch 171, inverters 172 through 174, AND circuits 175 and 176, and an OR circuit 177. The ERR information storage latch 124 is constituted by a flip-flop circuit.

The switch 171 switches either to Hi or to Low as a predetermined expected value. The switch 171 outputs the expected value to the inverter 172.

The inverter 172 outputs an inversion signal of the expected value coming from the switch 171 to the inverter 173 and to the AND circuit 176.

The inverter 173 outputs an inversion signal of the output from the inverter 172 to the AND circuit 175. In other words, the inverter 173 outputs the expected value itself to the AND circuit 175.

The inverter 174 outputs to the AND circuit 175 an inversion signal of a transfer result REP_out from the time code transfer one-bit row (Bit_n) 141-*n*.

The AND circuit 175 ANDs the output signal from the inverter 173 and that from the inverter 174, and outputs the result of the operation to the OR circuit 177. In other words, when the expected value matches an inversion signal of the transfer result REP_out, the AND circuit 175 outputs a Hi signal.

The AND circuit 176 performs a logical AND operation of the transfer result REP_out from the time code transfer one-bit row (Bit_n) 141-*n* and the output signal from the inverter 172, and outputs the result of the operation to the OR circuit 177. In other words, when an inversion signal of the expected value matches the transfer result REP_out, the AND circuit 176 outputs a Hi signal.

The OR circuit 177 performs a logical OR operation of the output signal from the AND circuit 175 and that from the AND circuit 176, and outputs the result of the operation to the ERR information storage latch 124 including a flip-flop circuit. The OR circuit 177 thus causes the ERR information storage latch 124 to latch the result of the logical operation as the ERR information.

Figure 8:
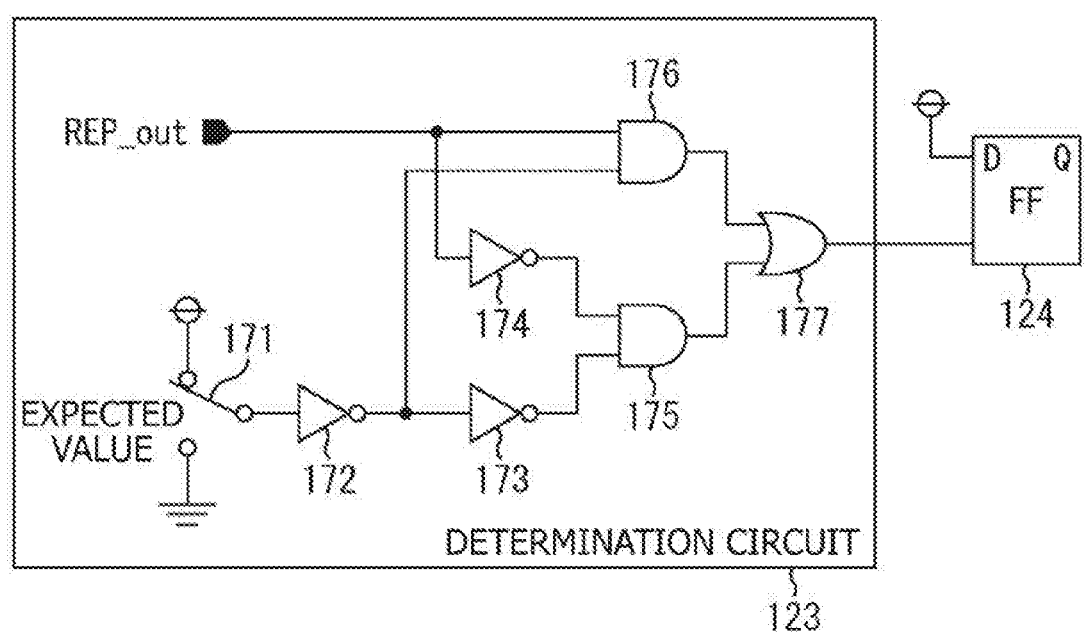
FIG. 8 is an explanatory diagram explaining an exemplary configuration of a determination circuit and an ERR information storage latch in FIG. 5.

In the configuration depicted in FIG. 8, when the expected value matches the transfer result REP_out from the time code transfer one-bit row (Bit_n) 141-*n*, the determination circuit 123 outputs a Low signal. On the other hand, when the expected value does not match the transfer result REP_out from the time code transfer one-bit row (Bit_n) 141-*n*, the determination circuit 123 outputs a Hi signal.

The result of the determination from the OR circuit 177 is latched by the ERR information storage latch 124.

<9. Failure Detection and Relief Process>

Figure 9:
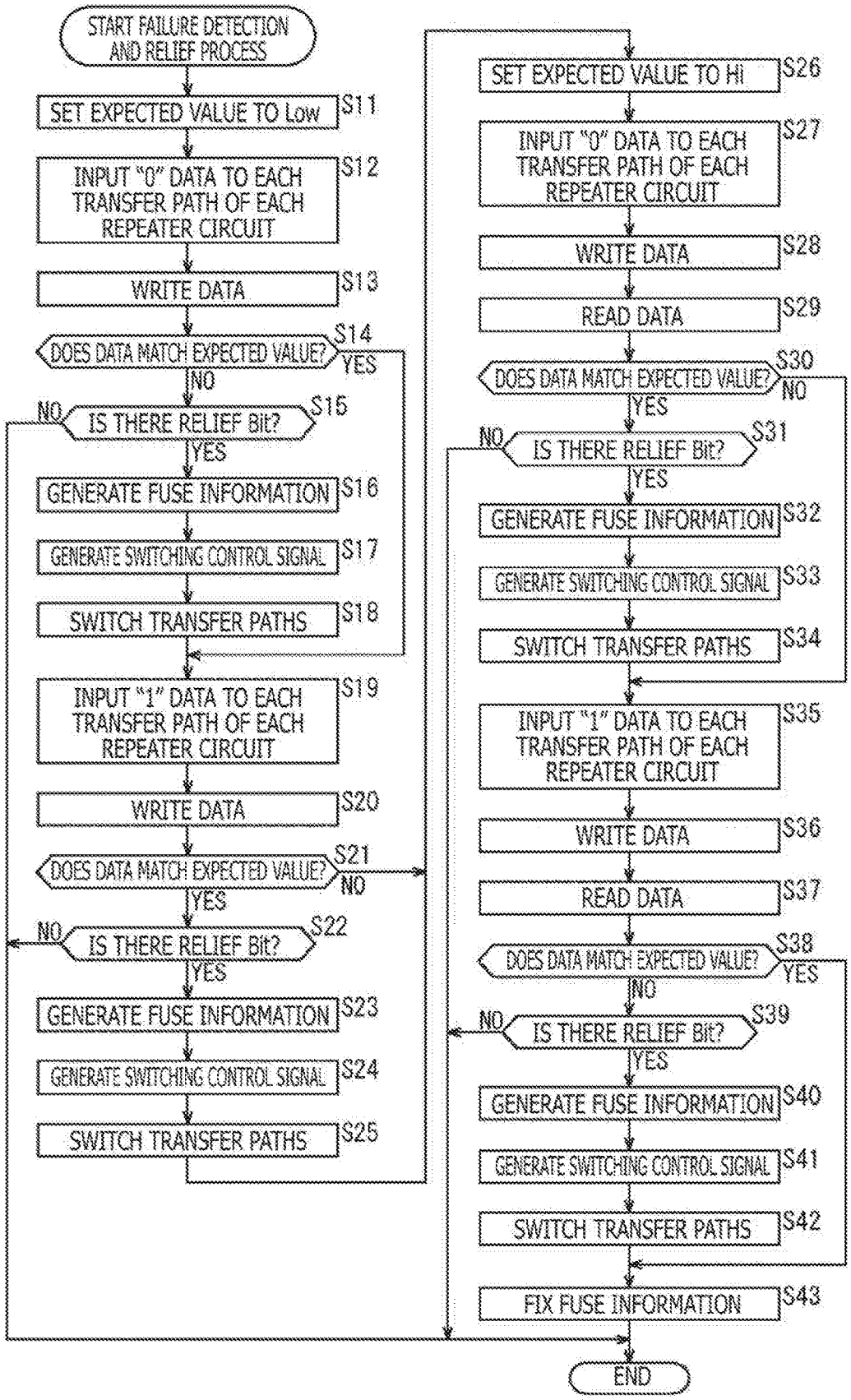
FIG. 9 is a flowchart explaining a failure detection and relief process that uses the time code transfer section in FIG. 5.

A failure detection and relief process is explained below with reference to the flowchart of FIG. 9.

In step S11, the controller 29 controls the switch 171 in the determination circuit 123 of each bit to set the expected value to Low.

In step S12, the controller 29 controls the data line selection signal generation circuit 113 to connect the switches SW0 through SWn in the data line selection circuits 121 and 122 to connect with some of the terminals 141*a*-0 through 141*a*-*n* for the time code transfer one-bit row (Bit_0) 141-0 through the time code transfer one-bit row (Bit_n) 141-*n* and of the terminal 142*a* for the time code transfer one-bit row (relief Bit) 142 for (n+1) bits.

For example, by default, the switches SW0 through SWn are connected, respectively, with the terminals 141*a*-0 through 141*a*-*n* for the time code transfer one-bit row (Bit_0) 141-0 through the time code transfer one-bit row (Bit_n) 141-*n*. Furthermore, in the case where a faulty transfer path has been detected beforehand, the switches SW0 through SWn are connected with the terminals 141*a*-0 through 141*a*-*n* for the time code transfer one-bit row (Bit_0) 141-0 through the time code transfer one-bit row (Bit_n) 141-*n* and with the terminal 142*a* for the time code transfer one-bit row (relief Bit) 142, excluding the faulty transfer path, for (n+1) bits. However, since the failure detection and relief process is expected to be performed upon completion of production, step S12 is usually processed by default.

The controller 29 then controls the time code generation section 26 to output the data of each bit set to "0" in the time code onto the transfer paths for the time code transfer one-bit row (Bit_0) 141-0 through the time code transfer one-bit row (Bit_n) 141-*n*.

In step S13, the DFF group 151 configuring the transfer paths for the time code transfer one-bit row (Bit_0) 141-0 through the time code transfer one-bit row (Bit_n) 141-*n* performs a sequential write of the time code repeatedly to the latches of the bits in the latch storage section 72 of the data storage section 52. At the same time, the DFF group 151 transfers and outputs the time code as the transfer results REP_out0 through REP_outn to the determination circuits 123-0 through 123-*n* for the bits involved. At this point, as needed, the DFF group 151 constituting the transfer path for the time code transfer one-bit row (relief Bit) 142 performs a sequential write of the time code repeatedly to the latch corresponding to the relief bit of the relief bit latch storage section 73 while also transferring the time code as the transfer result REP_out for output to the determination circuit 123 of the corresponding bit.

In step S14, the controller 29 controls the determination circuit 123 of each bit to determine whether or not the expected value matches the transfer result and to store the result of the determination into the ERR information storage latch 124. Here, the expected value of each bit is Low. The transfer results REP_out0 through REP_outn of the bits of the time code are valid if they are 0. Thus in case of a mismatch (in the case where REP_out0 through REP_outn are 1), an error is assumed to have occurred on the transfer paths constituting the time code transfer one-bit row (Bit_0) 141-0 through the time code transfer one-bit row (Bit_n) 141-*n*. Control is then transferred to step S15.

In step S15, the controller 29 determines whether or not the time code transfer one-bit row (relief Bit) 142 is left unused. Here, the time code transfer one-bit row (relief Bit) 142 is bit 1. During the first round of processing, for example, the time code transfer one-bit row (relief Bit) 142 that is bit 1 is supposed to be left unused. Control is thus transferred to step S16.

In step S16, the controller 29 supplies address information to the ERR information storage latch 124 causing the ERR information storage latch 124 to supply the FUSE information generation circuit 125 with ERR information as the information regarding the bit at which the error has occurred. On the basis of the ERR information, the FUSE information generation circuit 125 generates FUSE information indicating the transfer path on which the error has occurred and stores the generated FUSE information into the FUSE circuit 112. At the same time, the FUSE information generation circuit 125 notifies the control signal generation circuit 111 that the error has occurred.

In step S17, the control signal generation circuit 111 generates a switching control signal and notifies the data line selection signal generation circuit 113 thereof.

In step S18, given the switching control signal, the data line selection signal generation circuit 113 controls the data line selection circuits 121 and 122 in accordance with the FUSE information stored in the FUSE circuit 112. Through such control of the data line selection circuits 121 and 122, the data line selection signal generation circuit 113 operates the switches SW0 through SWn to reconfigure the transfer paths for the time code of (n+1) bits using those of the transfer paths for the time code transfer one-bit row (Bit_0) 141-0 through the time code transfer one-bit row (Bit_n) 141-*n* that are free of error and the transfer path formed by the time code transfer one-bit row (relief Bit) 142, as explained above with reference to FIG. 6.

In the case where the expected value matches the transfer result REP_out in step S14, no error is detected and steps S15 through S18 are thus skipped.

In step S19, the controller 29 controls the time code generation section 26 to output the data on each bit set to "1" in the time code to each of the transfer paths for the time code transfer one-bit row (Bit_0) 141-0 through the time code transfer one-bit row (Bit_n) 141-*n*.

In step S20, the DFF group 151 configuring the transfer paths for the time code transfer one-bit row (Bit_0) 141-0 through the time code transfer one-bit row (Bit_n) 141-*n* performs a sequential write of the time code repeatedly to the latch storage section 72 in the data storage section 52. At the same time, the DFF group 151 transfers and outputs the time code as the transfer result REP_out to the determination circuit 123 of each bit. At this point, as needed, the DFF group 151 configuring the transfer path for the time code transfer one-bit row (relief Bit) 142 performs a sequential write of the time code repeatedly to the latch corresponding to the relief bit in the relief bit latch storage section 73 while also transferring and outputting the time code as the transfer result REP_out to the determination circuit 123 of the corresponding bit.

In step S21, the controller 29 controls the determination circuit 123 of each bit to determine whether or not the expected value matches the transfer result, and stores the result of the determination into the ERR information storage latch 124. Here, the expected value of each bit is Low. The transfer results REP_out0 through REP_outn of the bits of the time code are valid if they are 1. Thus in the case of a match (in the case where the transfer results REP_out0 through REP_outn are 0), an error is assumed to have occurred on the transfer paths constituting the time code transfer one-bit row (Bit_0) 141-0 through the time code transfer one-bit row (Bit_n) 141-n. Control is then transferred to step S22.

In step S22, the controller 29 determines whether or not the time code transfer one-bit row (relief Bit) 142 is left unused. In the case where it is determined that the time code transfer one-bit row (relief Bit) 142 is left unused, control is transferred to step S23.

In step S23, the controller 29 supplies address information to the ERR information storage latch 124 causing the ERR information storage latch 124 to supply the FUSE information generation circuit 125 with ERR information as the information regarding the bit at which the error has occurred. On the basis of the ERR information, the FUSE information generation circuit 125 generates FUSE information indicating the transfer path on which the error has occurred and stores the generated FUSE information into the FUSE circuit 112. At the same time, the FUSE information generation circuit 125 notifies the control signal generation circuit 111 that the error has occurred.

In step S24, the control signal generation circuit 111 generates a switching control signal and notifies the data line selection signal generation circuit 113 thereof.

In step S25, given the switching control signal, the data line selection signal generation circuit 113 controls the data line selection circuits 121 and 122 in accordance with the FUSE information stored in the FUSE circuit 112. Through such control of the data line selection circuits 121 and 122, the data line selection signal generation circuit 113 operates the switches SW0 through SWn to reconfigure the transfer paths for the time code of (n+1) bits using those of the transfer paths for the time code transfer one-bit row (Bit_0) 141-0 through the time code transfer one-bit row (Bit_n) 141-n that are free of error and the transfer path formed by the time code transfer one-bit row (relief Bit) 142.

In the case where it is determined in step S21 that the expected value does not match the transfer result REP_out, that means no error is detected. In this case, steps S22 through S25 are skipped.

In step S26, the controller 29 controls the switch 171 in the determination circuit 123 of each bit to set the expected value to Hi.

In step S27, the controller 29 controls the time code generation section 26 to output the data on each bit set to "0" in the time code to each of the transfer paths for the time code transfer one-bit row (Bit_0) 141-0 through the time code transfer one-bit row (Bit_n) 141-n.

In step S28, the DFF group 151 configuring the transfer paths for the time code transfer one-bit row (Bit_0) 141-0 through the time code transfer one-bit row (Bit_n) 141-n performs a sequential write of the time code repeatedly to the latch storage section 72 in the data storage section 52. At this point, as needed, the DFF group 151 configuring the transfer path for the time code transfer one-bit row (relief Bit) 142 performs repeatedly a sequential write of the corresponding time code data to the relief bit in the relief bit latch storage section 73.

In step S29, the DFF group 151 configuring the transfer paths for the time code transfer one-bit row (Bit_0) 141-0 through the time code transfer one-bit row (Bit_n) 141-n performs a sequential read of the time code repeatedly from the latch storage section 72 in which the time code data is latched in the data storage section 52. At the same time, the DFF group 151 transfers and outputs the read time code as the transfer result REP_out to the determination circuit 123 of each bit. At this point, as needed, the DFF group 151 configuring the transfer path for the time code transfer one-bit row (relief Bit) 142 performs a sequential read of the time code data repeatedly from the relief bit to which the time code data was written correspondingly in the relief bit latch storage section 73 while also transferring and outputting the read time code as the transfer result REP_out to the determination circuit 123 of the corresponding bit.

In step S30, the controller 29 controls the determination circuit 123 of each bit to determine whether or not the expected value matches the transfer result, and stores the result of the determination into the ERR information storage latch 124. Here, the expected value of each bit is Hi. The transfer results REP_out0 through REP_outn of the bits of the time code are valid if they are 0. Thus in the case of a match (in the case where the transfer results REP_out0 through REP_outn are 1), an error is assumed to have occurred either in the latch storage section 72 of the data storage section 52 for the bits corresponding to the transfer paths constituting the time code transfer one-bit row (Bit_0) 141-0 through the time code transfer one-bit row (Bit_n) 141-n, or in the relief bit latch storage section 73. Control is then transferred to step S31.

In step S31, the controller 29 determines whether or not the time code transfer one-bit row (relief Bit) 142 is left unused. In the case where it is determined that the time code transfer one-bit row (relief Bit) 142 is left unused, control is transferred to step S16.

In step S32, the controller 29 supplies address information to the ERR information storage latch 124 causing the ERR information storage latch 124 to supply the FUSE information generation circuit 125 with ERR information as the information regarding the bit at which the error has occurred. On the basis of the ERR information, the FUSE information generation circuit 125 generates FUSE information indicating the transfer path on which the error has occurred and stores the generated FUSE information into the FUSE circuit 112. At the same time, the FUSE information generation circuit 125 notifies the control signal generation circuit 111 that the error has occurred.

In step S33, the control signal generation circuit 111 generates a switching control signal and notifies the data line selection signal generation circuit 113 thereof.

In step S34, given the switching control signal, the data line selection signal generation circuit 113 controls the data line selection circuits 121 and 122 in accordance with the FUSE information stored in the FUSE circuit 112. Through such control of the data line selection circuits 121 and 122, the data line selection signal generation circuit 113 operates the switches SW0 through SWn to reconfigure the transfer paths for the time code of (n+1) bits using those of the transfer paths for the time code transfer one-bit row (Bit_0) 141-0 through the time code transfer one-bit row (Bit_n) 141-n that are free of error and the transfer path formed by the time code transfer one-bit row (relief Bit) 142.

In the case where it is determined in step S30 that the expected value matches the transfer result REP_out, that means no error is detected. In this case, steps S31 through S34 are skipped.

In step S35, the controller 29 controls the time code generation section 26 to output the data of each bit set to "1" in the time code to each of the transfer paths for the time code transfer one-bit row (Bit_0) 141-0 through the time code transfer one-bit row (Bit_n) 141-n.

In step S36, the DFF group 151 configuring the transfer paths for the time code transfer one-bit row (Bit_0) 141-0 through the time code transfer one-bit row (Bit_n) 141-n performs a sequential write of the time code repeatedly to the latch storage section 72 in the data storage section 52. At this point, as needed, the DFF group 151 configuring the transfer path for the time code transfer one-bit row (relief Bit) 142 performs repeatedly a sequential write of the corresponding time code data to the relief bit in the relief bit latch storage section 73.

In step S37, the DFF group 151 configuring the transfer paths for the time code transfer one-bit row (Bit_0) 141-0 through the time code transfer one-bit row (Bit_n) 141-n performs a sequential read of the time code repeatedly from the latch storage section 72 in which the time code data is latched in the data storage section 52. At the same time, the DFF group 151 transfers and outputs the read time code as the transfer result REP_out to the determination circuit 123 of each bit. At this point, as needed, the DFF group 151 configuring the transfer path for the time code transfer one-bit row (relief Bit) 142 performs a sequential read of the time code data repeatedly from the relief bit to which the time code has been written correspondingly in the relief Bit latch storage section 73 while also transferring and outputting the read time code as the transfer result REP_out to the determination circuit 123 of the corresponding bit.

In step S38, the controller 29 controls the determination circuit 123 of each bit to determine whether or not the expected value matches the transfer result, and stores the result of the determination into the ERR information storage latch 124. Here, the expected value of each bit is Hi. The transfer results REP_out0 through REP_outn of the bits of the time code are valid if they are 1. Thus in the case of a mismatch (in the case where the transfer results REP_out0 through REP_outn are 0), an error is assumed to have occurred either in the latch storage section 72 of the data storage section 52 for the bits corresponding to the transfer paths constituting the time code transfer one-bit row (Bit_0) 141-0 through the time code transfer one-bit row (Bit_n) 141-n, or in the relief bit latch storage section 73. Control is then transferred to step S39.

In step S39, the controller 29 determines whether or not the time code transfer one-bit row (relief Bit) 142 is left unused. In the case where it is determined that the time code transfer one-bit row (relief Bit) 142 is left unused, control is transferred to step S40.

In step S40, the controller 29 supplies address information to the ERR information storage latch 124 causing the ERR information storage latch 124 to supply the FUSE information generation circuit 125 with ERR information as the information regarding the bit at which the error has occurred. On the basis of the ERR information, the FUSE information generation circuit 125 generates FUSE information indicating the transfer path on which the error has occurred and stores the generated FUSE information into the FUSE circuit 112. At the same time, the FUSE information generation circuit 125 notifies the control signal generation circuit 111 that the error has occurred.

In step S41, the control signal generation circuit 111 generates a switching control signal and notifies the data line selection signal generation circuit 113 thereof.

In step S42, given the switching control signal, the data line selection signal generation circuit 113 controls the data line selection circuits 121 and 122 in accordance with the FUSE information stored in the FUSE circuit 112. Through such control of the data line selection circuits 121 and 122, the data line selection signal generation circuit 113 operates the switches SW0 through SWn to reconfigure the transfer paths for the time code of (n+1) bits using those of the transfer paths for the time code transfer one-bit row (Bit_0) 141-0 through the time code transfer one-bit row (Bit_n) 141-n that are free of error and the transfer path formed by the time code transfer one-bit row (relief Bit) 142.

In the case where it is determined in step S38 that the expected value matches the transfer result REP_out, that means no error is detected. In this case, steps S39 through S42 are skipped.

In step S43, the controller 29 fixes the FUSE information stored in the FUSE circuit 112.

In the case where it is determined in step S15, S22, S31, or S39 that the time code transfer one-bit row (relief Bit) 142 is not left unused, the time code transfer one-bit row (relief Bit) 142 is no longer available. Thus the time code transfer section 23 terminates the process. In this case, the time code transfer section 23 cannot function normally, so that this solid-state imaging apparatus 1 is disposed of as a defective product.

In steps S11 through S25 of the above process, it is determined whether there is an error on any one of the transfer paths set for the time code transfer one-bit row (Bit_0) 141-0 through the time code transfer one-bit row (Bit_n) 141-n over which the time code is transferred. When a transfer path on which an error has occurred is detected, the transfer paths are reconfigured using the time code transfer one-bit row (relief Bit) 142 and the relief Bit latch storage section 73.

In that case, failure detection is carried out with the generated time code switched between "0" and "1." This makes it possible to detect both the failure fixed to "0" and the failure fixed to "1" on a given transfer path.

Furthermore, in steps S26 through S42 of the above process, it is determined whether there is an error of any of the latches used both in the latch storage section 72 and in the relief Bit latch storage section 73 of the data storage part 52 for the bits corresponding to the transfer paths set for the time code transfer one-bit row (Bit_0) 141-0 through the time code transfer one-bit row (Bit_n) 141-n over which the time code is transferred. When an erroneous latch is detected, the latches corresponding to the transfer paths are reconfigured using the time code transfer one-bit row (relief Bit) 142 and the relief Bit latch storage part 73.

In that case, failure detection is carried out with the generated time code switched between 0 and 1. This makes it possible to detect both the failure fixed to "0" and the failure fixed to "1" on a given transfer path.

In other words, in the above-described process, the failure of a transfer path and that of a latch are determined individually. In the case where any of the latches or of the transfer paths is detected to be erroneous, the transfer path of the erroneous bit and the latch corresponding thereto are deleted. The transfer paths and the latches are then reconfigured using both the transfer path constituted by the time code transfer one-bit row (relief Bit) 142 and the latch in the relief Bit latch storage section 73 for the corresponding bit.

Consequently, performing the above-described failure detection and relief process before the shipping of the product, for example, suppresses the drop in yield due to a severed wire or other defect in the imaging element with an ever-higher density of circuitry. This makes it possible to reduce the cost of the product.

Furthermore, the above-described failure detection and relief process may be carried out periodically on the product after shipping thereof and during use, for example. Upon detection of a failure during that process, the transfer paths may be switched. This contributes to improving the durability of the product.

It is also explained above that the solid-state imaging apparatus 1 is configured to be furnished internally with the FUSE information using the FUSE circuit 112. Alternatively, the FUSE information alone may be acquired as data at the time of product inspection. The data may then be shipped along with the chip to the user so that the user may conduct circuit relief control on the user's side.

It was further explained above that the chip is configured to incorporate the transfer paths for relief use. Alternatively, by taking advantage of different degrees of importance of the bits involved, for example, each of the bits may be weighted according to the degree of importance. The bits targeted for relief may then be limited to the high-order bits of which the weights are greater than a predetermined weight. Any one of the high-order bits on which an error has occurred may then be replaced with the relief bit configured by a lower-weight bit, i.e., a low-order bit with a lower degree of importance. This configuration makes it possible to relieve a high-order bit with a high degree of importance without separately providing transfer paths and latches for relief use.

<10. Examples of Application to Electronic Devices>

The above-described solid-state imaging apparatus 1 may be used in conjunction with various electronic devices such as imaging apparatuses including digital still cameras and digital video cameras, mobile phones equipped with an imaging function, or other devices with the imaging function.

Figure 10:
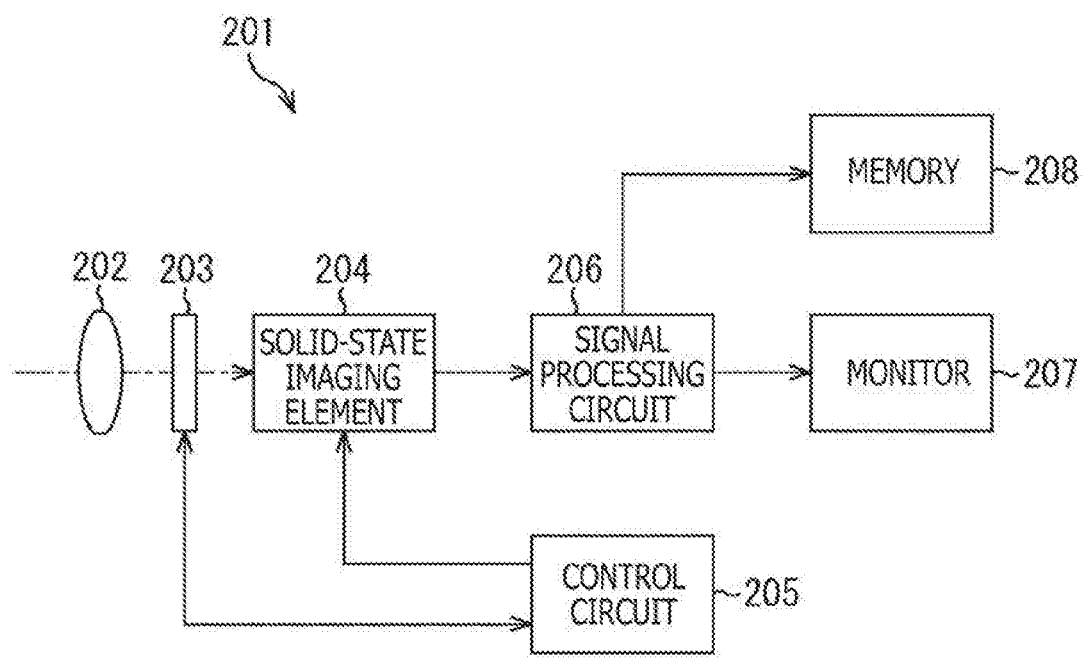
FIG. 10 is a block diagram depicting an exemplary configuration of an imaging apparatus as an electronic device in which the solid-state imaging apparatus of the present disclosure is used.

FIG. 10 is a block diagram depicting an exemplary configuration of an imaging apparatus as an electronic device to which the technology of the present disclosure is applied.

An imaging apparatus 201 depicted in FIG. 10 includes an optical system 202, a shutter device 203, a solid-state imaging element 204, a drive circuit 205, a signal processing circuit 206, a monitor 207, and a memory 208. The imaging apparatus 201 is capable of capturing still images and moving images.

The optical system 202 is configured with a single or multiple lenses. The optical system 202 leads light from an object (i.e., incident light) to the solid-state imaging element 204 so as to let an image be formed on the light receiving surface of the solid-state imaging element 204.

The shutter device 203 is interposed between the optical system 202 and the solid-state imaging element 204. Under control of the drive circuit 205, the shutter device 203 controls the period of light irradiation to the solid-state imaging element 204 and the period of blocking light thereto.

The solid-state imaging element 204 is configured with a package that includes the above-described solid-state imaging element. The solid-state imaging element 204 stores signal charges for a predetermined period in response to the light of which the image is formed on the light receiving surface via the optical system 202 and the shutter device 203. The signal charges stored in the solid-state imaging element 04 are transferred in keeping with a drive signal (i.e., timing signal) supplied from the drive circuit 205.

The drive circuit 205 outputs drive signals for controlling the transfer operation of the solid-state imaging element 204 and the shutter operation of the shutter device 203, thereby driving the solid-state imaging element 204 and the shutter device 203.

The signal processing circuit 206 performs various types of signal processing on the signal charges output from the solid-state imaging element 204. The image (i.e., image data) obtained from the signal processing performed by the signal processing circuit 206 is supplied to and display on the monitor 207 and also supplied and written (recorded) to the memory 208.

The imaging apparatus 201 configured as described above may use the solid-state imaging apparatus 1 in place of the optical system 202, shutter device 203, and solid-state imaging element 204 outlined above, thereby suppressing the drop in yield of the product with an ever-higher density of circuitry.

<11. Usage Examples of the Solid-State Imaging Apparatus>

Figure 11:
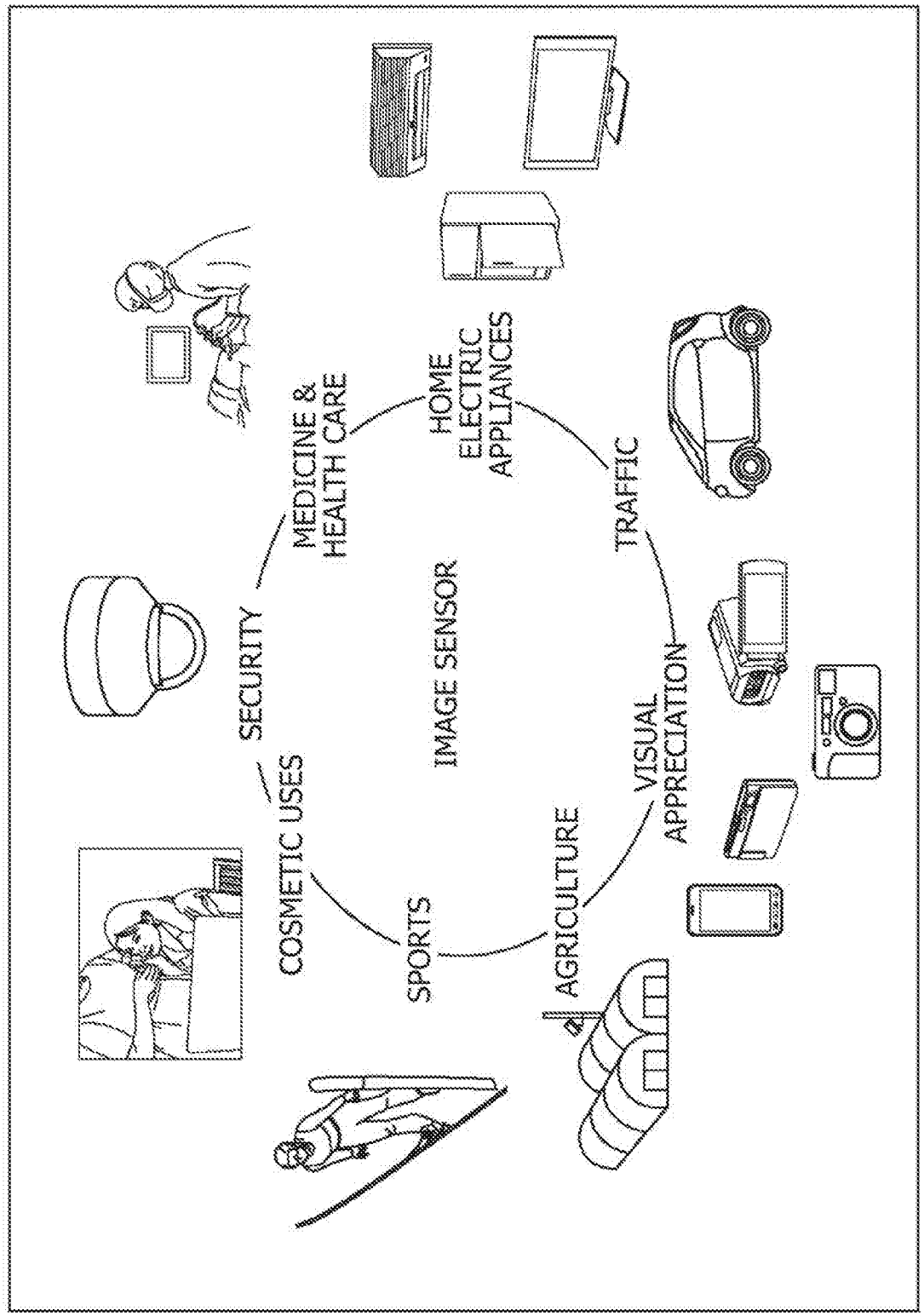
FIG. 11 is an explanatory diagram explaining usage examples of the solid-state imaging apparatus to which the technology of the present disclosure is applied.

FIG. 11 is a schematic diagram depicting usage examples of the above-described solid-state imaging apparatus 1.

The camera module described above may be used in various cases, such as where diverse types of light including visible light, infrared radiation, ultraviolet radiation, or X-radiation are sensed, as outlined below.

Cases of devices that capture images for use in visual appreciation, such as digital cameras and camera function-equipped mobile phones.

Cases of devices for use in the field of vehicle traffic, including onboard sensors that capture images of the front side, rear side, surroundings, and interior of a vehicle to ensure safe operations such as automated vehicle stop and to recognize the driver's status; surveillance cameras for monitoring passing vehicles and the roads on which they travel; and distance measurement sensors for measuring the distance between vehicles.

Cases of devices that capture images of users' gestures to operate home electric appliances such as TV sets, refrigerators, and air conditioners in a manner reflecting the gestures.

Cases of devices for use in the field of medicine and health care, such as endoscopes and instruments that capture images of blood vessels using received infrared radiation.

Cases of devices for use in the field of security, such as surveillance cameras for crime prevention and cameras for personal authentication.

Cases of devices for use in the field of beauty care, such as skin measuring instruments for capturing images of the skin and microscopes for capturing images of the scalp.

Cases of devices for use in the field of sports, such as action cameras and wearable cameras.

Cases of devices for use in the field of agriculture, such as surveillance cameras for monitoring fields and crops.

The present disclosure may be implemented preferably in the following configurations:

(1) An imaging element including:

a plurality of transfer paths configured to transfer, bit by bit, a time code of a predetermined number of bits for use in converting into a digital signal a pixel signal reflecting intensity of light received by a pixel;

a relief transfer path configured the same as the transfer paths;

a determination section configured to determine whether there is an error on any of the transfer paths; and a switching section configured to switch some of the plurality of transfer paths and a plurality of the relief transfer paths for use as the transfer paths for transferring the time code of the predetermined number of bits on a basis of a result of the determination made by the determination section.

(2) The imaging element as stated in paragraph (1) above, in which the determination section determines whether there is an error on any of the transfer paths by comparing an expected value of a result of transferring predetermined data via the transfer paths with the result of having transferred the predetermined data via the transfer paths.

(3) The imaging element as stated in paragraph (2) above, in which each of the plurality of transfer paths includes a storage section configured to store the time code correspondingly bit by bit.

(4) The imaging element as stated in paragraph (3) above in which, at a time of transfer via the transfer paths, the predetermined data is written to the storage section corresponding to each of the transfer paths at the same time as being transferred, the determination section determining whether there is an error on any of the transfer paths by comparing the expected value with the result of having transferred the predetermined data via the transfer paths.

(5) The imaging element as stated in paragraph (4) above in which, with the expected value set to a predetermined value, the determination section determines whether there is an error on each of the transfer paths by comparing the expected value with a result of transferring the predetermined data set to "1" and with a result of transferring the predetermined data set to "0" independently of each other.

(6) The imaging element as stated in paragraph (4) above in which, on a basis of a result of the determination, the switching section switches the transfer paths excluding the transfer path determined to be erroneous and the relief transfer path, for use as the transfer paths for transferring the time code of the predetermined number of bits.

(7) The imaging element as stated in paragraph (6) above in which, on the basis of the result of the determination, the switching section isolates the bit transfer path determined to be erroneous, and switches the plurality of transfer paths of the bits lower than the bit determined to be erroneous and the relief transfer paths for use in transferring the time code of the bits lower than the erroneous bits.

(8) The imaging element as stated in paragraph (3) above in which, at the time of transfer via the transfer paths, the predetermined data is written to the storage sections corresponding to the transfer paths before being read out and transferred, the determination section determining whether there is an error in any of the storage sections corresponding to the transfer paths by comparing the expected value with the result of writing the predetermined data to the storage sections via the transfer paths before having the predetermined data read out and transferred.

(9) The imaging element as stated in paragraph (8) above in which, with the expected value set to a predetermined value, the determination section determines whether there is an error in each of the storage sections corresponding to the transfer paths by comparing the expected value with a result of transferring the predetermined data set to "1" and a result of transferring the predetermined data set to "0" independently of each other.

(10) The imaging element as stated in paragraph (8) above, in which the relief transfer path further includes a relief storage section configured to store, bit by bit, the time code to be transferred, and on a basis of a result of the determination, the switching section switches the storage sections corresponding to the plurality of transfer paths excluding the storage section determined to be erroneous and the corresponding transfer path and the relief storage section corresponding to the relief transfer path, for use as the storage sections corresponding to the transfer paths used for transferring, writing, and reading out the time code of the predetermined number of bits.

(11) The imaging element as stated in paragraph (3) above, in which the determination section determines whether there is an error on any of the transfer paths by comparing the expected value with the result of transferring the predetermined data via the transfer paths, before determining whether there is an error in any of the storage sections corresponding to the plurality of transfer paths by comparing the expected value with the result of writing the predetermined data to the storage sections before having the predetermined data read out and transferred, and on a basis of a result of the determination, the switching section switches the storage sections corresponding to the plurality of transfer paths excluding the transfer path determined to be erroneous and the corresponding storage section, and the relief storage section corresponding to the relief transfer path, for use as the storage sections corresponding to the transfer paths used either for transferring and writing the time code of the predetermined number of bits or for transferring, writing, and reading out the time code of the predetermined number of bits.

(12) A control method for use with an imaging element including:

a plurality of transfer paths configured to transfer, bit by bit, a time code of a predetermined number of bits for use in converting into a digital signal a pixel signal reflecting intensity of light received by a pixel; and a relief transfer path configured the same as the transfer paths;

the control method including:

determining whether there is an error on any of the transfer paths; and switching some of the plurality of transfer paths and a plurality of the relief transfer paths for use as the transfer paths for transferring the time code of the predetermined number of bits on a basis of a result of the determination.

(13) An imaging apparatus including:

a plurality of transfer paths configured to transfer, bit by bit, a time code of a predetermined number of bits for use in converting into a digital signal a pixel signal reflecting intensity of light received by a pixel;

a relief transfer path configured the same as the transfer paths;

a determination section configured to determine whether there is an error on any of the transfer paths; and a switching section configured to switch some of the plurality of transfer paths and a plurality of the relief transfer paths for use as the transfer paths for transferring the time code of the predetermined number of bits on a basis of a result of the determination made by the determination section.

(14) An electronic device including:
a plurality of transfer paths configured to transfer, bit by bit, a time code of a predetermined number of bits for use in converting into a digital signal a pixel signal reflecting intensity of light received by a pixel;
a relief transfer path configured the same as the transfer paths;
a determination section configured to determine whether there is an error on any of the transfer paths; and
a switching section configured to switch some of the plurality of transfer paths and a plurality of the relief transfer paths for use as the transfer paths for transferring the time code of the predetermined number of bits on a basis of a result of the determination made by the determination section.

REFERENCE SIGNS LIST

Solid-state imaging apparatus, 21 Pixel, 22 Pixel array section, 23 Time code transfer section, 26 Time code generation section, 28 Output section, 29 Controller, 41 Pixel circuit, 42 ADC, 51 Comparison circuit, 52 Data storage section, 61 Differential input circuit, 62 Voltage conversion circuit, 63 Positive feedback circuit, 71 Latch control circuit, Latch storage section, 73 Relief Bit latch storage section, 101, 101-1 to 101-m Repeater circuit, 111 Control signal generation circuit, 112 FUSE circuit, 113 Data line selection signal generation circuit, 121, 122 Data line selection circuit, 123, 123-0 to 123-n Determination circuit, 124 ERR information storage latch, 125 FUSE information generation circuit, 141, 141-0 to 141-n Time code transfer one-bit rows (Bit_0) to (Bit_n), 142 Time code transfer one-bit row (relief bit)

The invention claimed is:
1. An imaging element, comprising:
a time code transfer circuit that includes:
  a plurality of transfer paths configured to transfer, bit by bit, a time code of a specific number of bits for use in conversion of a pixel signal to a digital signal, wherein the pixel signal reflects intensity of light received by a pixel; and
  a relief transfer path;
a determination circuit configured to:
  compare an expected value of a result of a transfer of specific data via the plurality of transfer paths with an actual value of the result of the transfer of the specific data via the plurality of transfer paths; and
  determine presence of an error on a transfer path of the plurality of transfer paths based on the comparison of the expected value of the result of the transfer of the specific data via the plurality of transfer paths with the actual value of the result of the transfer of the specific data via the plurality of transfer paths; and
a data line selection circuit that includes a plurality of switches, wherein
  each transfer path of the plurality of transfer paths is connected to a corresponding switch of the plurality of switches,
  the plurality of switches configured to switch connection of the transfer path of the plurality of transfer paths with the relief transfer path based on the determination of the presence of the error on the transfer path, and
  the connection is switched to use the relief transfer path as the transfer path for the transfer of the time code.

2. The imaging element according to claim 1, wherein
each of the plurality of transfer paths includes a storage section, and
the storage section of each of the plurality of transfer paths is configured to store a bit of the specific number of bits of the time code transferred by a corresponding transfer path of the plurality of transfer paths.

3. The imaging element according to claim 2, wherein at a time of the transfer via the plurality of transfer paths, the specific data is written to the storage section corresponding to each of the plurality of transfer paths.

4. The imaging element according to claim 3, wherein
with the expected value set to a specific value, the determination circuit is further configured to determine the presence of the error on each of the plurality of transfer paths based on the comparison of the expected value with the result of the transfer of the specific data that is set to "1" and the comparison of the expected value with the result of the transfer of the specific data that is set to "0".

5. The imaging element according to claim 3, wherein
based on a result of the determination of the presence of the error on the transfer path, the plurality of switches is further configured to switch the connection of the transfer path determined to be erroneous with the relief transfer path, and
the connection is switched to use the relief transfer path as the transfer path for the transfer of the time code.

6. The imaging element according to claim 5, wherein
based on the result of the determination, the plurality of switches is further configured to:
  isolate the transfer path determined to be erroneous; and
  switch the connection of the plurality of transfer paths of the specific number of bits lower than the transfer path determined to be erroneous and the relief transfer path, wherein the connection is switched for the transfer of the time code of the specific number of bits lower than a bit corresponding to the transfer path determined to be erroneous.

7. The imaging element according to claim 2, wherein
at the time of the transfer via the plurality of transfer paths, the specific data is written to the storage section corresponding to each of the plurality of transfer paths,
the specific data is written to the storage section prior to at least one of read out or the transfer, and
the determination circuit is further configured to:
  compare the expected value with a result of a writing operation of the specific data to the storage section via the plurality of transfer paths; and
  determine presence of an error in the storage section corresponding to the transfer path based on the comparison of the expected value with the result of the writing operation of the specific data to the storage section via the plurality of transfer paths.

8. The imaging element according to claim 7, wherein
with the expected value set to a specific value, the determination circuit is further configured to determine the presence of the error in each of the storage section corresponding to the plurality of transfer paths based on the comparison of the expected value with the result of the transfer of the specific data that is set to "1" and the comparison of the expected value with the result of the transfer of the specific data that is set to "0".

9. The imaging element according to claim 7, wherein
the relief transfer path further includes a relief storage section, the relief storage section of the relief transfer path is configured to store the bit of the specific number of bits of the time code transferred by the relief transfer path, and based on a result of the determination of the presence of the error in the storage section, the plurality of switches is further configured to switch the connection of storage section determined to be erroneous with the relief storage section corresponding to the relief transfer path, and the connection is switched to use the relief storage section as the storage section for at least one of the transfer of the time code, a write operation of the time code, or a read out operation of the time code.

10. The imaging element according to claim 2, wherein the determination circuit is further configured to:
   compare the expected value with a result of a writing operation of the specific data to the storage section; and
   determine the presence of the error on the transfer path prior to determination of presence of an error in the storage section corresponding to the transfer path,
the determination of the presence of the error in the storage section is based on the comparison of the expected value with the result of the writing operation of the specific data to the storage section,
the specific data is written to the storage section prior to at least one of read out or the transfer,
based on a result of the determination of at least one of the presence of the error on the transfer path or the presence of the error in the storage section, the plurality of switches is further configured switch the connection of the transfer path determined to be erroneous and a corresponding storage section, with a relief storage section corresponding to the relief transfer path, and
the connection is switched to use the relief storage section as the storage section for at least one of the transfer of the time code or a write operation of the time code or at least one of the transfer of the time code, the write operation of the time code, or a read out operation of the time code.

11. A control method, comprising:
in an imaging element, including:
   a time code transfer circuit that includes:
      a plurality of transfer paths configured to transfer, bit by bit, a time code of a specific number of bits for use in conversion of a pixel signal to a digital signal, wherein the pixel signal reflects intensity of light received by a pixel; and a relief transfer path; and
   a data line selection circuit that includes a plurality of switches, wherein each transfer path of the plurality of transfer paths is connected to a corresponding switch of the plurality of switches;
comparing an expected value of a result of a transfer of specific data via the plurality of transfer paths with an actual value of the result of the transfer of the specific data via the plurality of transfer paths;
determining presence of an error on a transfer path of the plurality of transfer paths based on the comparison of the expected value of the result of the transfer of the specific data via the plurality of transfer paths with the actual value of the result of the transfer of the specific data via the plurality of transfer paths; and
switching connection of the transfer path of the plurality of transfer paths with the relief transfer path based on the determination of the presence of the error on the transfer path, wherein the connection is switched to use the relief transfer path as the transfer path for the transfer of the time code.

12. An imaging apparatus, comprising:
a time code transfer circuit that includes:
   a plurality of transfer paths configured to transfer, bit by bit, a time code of a specific number of bits for use in conversion of a pixel signal to a digital signal, wherein the pixel signal reflects intensity of light received by a pixel; and
   a relief transfer path;
a determination circuit configured to:
   compare an expected value of a result of a transfer of specific data via the plurality of transfer paths with an actual value of the result of the transfer of the specific data via the plurality of transfer paths; and
   determine presence of an error on a transfer path of the plurality of transfer paths based on the comparison of the expected value of the result of the transfer of the specific data via the plurality of transfer paths with the actual value of the result of the transfer of the specific data via the plurality of transfer paths; and
a data line selection circuit that includes a plurality of switches, wherein
   each transfer path of the plurality of transfer paths is connected to a corresponding switch of the plurality of switches,
   the plurality of switches configured to switch connection of the transfer path of the plurality of transfer paths with the relief transfer path based on the determination of the presence of the error on the transfer path, and
   the connection is switched to use the relief transfer path as the transfer path for the transfer of the time code.

13. An electronic device, comprising:
a time code transfer circuit that includes:
   a plurality of transfer paths configured to transfer, bit by bit, a time code of a specific number of bits for use in conversion of a pixel signal to a digital signal, wherein the pixel signal reflects intensity of light received by a pixel; and
   a relief transfer path;
a determination circuit configured to:
   compare an expected value of a result of a transfer of specific data via the plurality of transfer paths with an actual value of the result of the transfer of the specific data via the plurality of transfer paths; and
   determine presence of an error on a transfer path of the plurality of transfer paths based on the comparison of the expected value of the result of the transfer of the specific data via the plurality of transfer paths with the actual value of the result of the transfer of the specific data via the plurality of transfer paths; and
a data line selection circuit that includes a plurality of switches, wherein
   each transfer path of the plurality of transfer paths is connected to a corresponding switch of the plurality of switches,
   the plurality of switches configured to switch connection of the transfer path of the plurality of transfer paths with the relief transfer path based on the determination of the presence of the error on the transfer path, and
   the connection is switched to use the relief transfer path as the transfer path for the transfer of the time code.

* * * * *